(12) United States Patent
Koyama

(10) Patent No.: US 8,902,209 B2
(45) Date of Patent: Dec. 2, 2014

(54) DISPLAY DEVICE

(75) Inventor: Jun Koyama, Kanagawa (JP)

(73) Assignee: Semiconductor Energy Laboatory Co., Ltd. (JP)

( * ) Notice: Subject to any disclaimer, the term of this patent is extended or adjusted under 35 U.S.C. 154(b) by 148 days.

(21) Appl. No.: 13/227,779

(22) Filed: Sep. 8, 2011

(65) Prior Publication Data

US 2012/0062539 A1 Mar. 15, 2012

(30) Foreign Application Priority Data

Sep. 10, 2010 (JP) .................................. 2010-202729

(51) Int. Cl.
*G06F 3/038* (2013.01)
*G02B 27/22* (2006.01)

(52) U.S. Cl.
CPC .................................. *G02B 27/2264* (2013.01)
USPC ................ 345/211; 345/204; 345/87; 349/15

(58) Field of Classification Search
USPC ................. 345/42–60; 359/462–471; 349/15; 348/42–65

See application file for complete search history.

(56) References Cited

U.S. PATENT DOCUMENTS

| | | |
|---|---|---|
| 5,731,856 A | 3/1998 | Kim et al. |
| 5,744,864 A | 4/1998 | Cillessen et al. |
| 6,046,787 A | 4/2000 | Nishiguchi |
| 6,239,453 B1 | 5/2001 | Yamada et al. |
| 6,294,274 B1 | 9/2001 | Kawazoe et al. |
| 6,563,174 B2 | 5/2003 | Kawasaki et al. |
| 6,580,405 B1 | 6/2003 | Yamazaki et al. |
| 6,727,522 B1 | 4/2004 | Kawasaki et al. |
| 6,730,966 B2 | 5/2004 | Koyama |
| 6,982,462 B2 | 1/2006 | Koyama |

(Continued)

FOREIGN PATENT DOCUMENTS

| | | |
|---|---|---|
| EP | 1737044 A | 12/2006 |
| EP | 2226847 A | 9/2010 |

(Continued)

OTHER PUBLICATIONS

Fortunato.E et al., "Wide-Bandgap High-Mobility ZnO Thin-Film Transistors Produced at Room Temperature,", Appl. Phys. Lett. (Applied Physics Letters), Sep. 27, 2004, vol. 85, No. 13, pp. 2541-2543.

(Continued)

*Primary Examiner* — Robin Mishler
(74) *Attorney, Agent, or Firm* — Husch Blackwell LLP

(57) ABSTRACT

A three-dimensional-image display device capable of displaying an image with high brightness while suppressing power consumption is provided. The display device is provided with an image display portion where a plurality of pixels is provided in a pixel portion, a light-shielding portion including a first shutter and a second shutter, and a control portion for controlling the transmittances of the first shutter and the second shutter in synchronization with display of an image for the right eye or an image for the left eye in the pixel portion. The pixel includes a switching transistor for controlling an input of an image signal to the pixel, a light emitting element, a driving transistor for controlling the value of a current supplied to the light emitting element in accordance with the image signal, and a current controlling transistor for controlling whether or not the current is supplied to the light emitting element.

18 Claims, 13 Drawing Sheets

(56) References Cited

U.S. PATENT DOCUMENTS

| | | | |
|---|---|---|---|
| 7,045,369 B2 | 5/2006 | Yamazaki et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,211,825 B2 | 5/2007 | Shih et al | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,345,661 B2 | 3/2008 | Miyagawa et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,525,119 B2 | 4/2009 | Koyama | |
| 7,659,872 B2* | 2/2010 | Yamashita et al. | 345/80 |
| 7,674,650 B2 | 3/2010 | Akimoto et al. | |
| 7,727,779 B2 | 6/2010 | Yamazaki et al. | |
| 7,732,819 B2 | 6/2010 | Akimoto et al. | |
| 8,395,564 B2* | 3/2013 | Shin et al. | 345/76 |
| 2001/0000335 A1 | 4/2001 | Yamada et al. | |
| 2001/0046027 A1 | 11/2001 | Tai et al. | |
| 2002/0056838 A1 | 5/2002 | Ogawa | |
| 2002/0132454 A1 | 9/2002 | Ohtsu et al. | |
| 2003/0189401 A1 | 10/2003 | Kido et al. | |
| 2003/0218222 A1 | 11/2003 | Wager et al. | |
| 2004/0038446 A1 | 2/2004 | Takeda et al. | |
| 2004/0127038 A1 | 7/2004 | Carcia et al. | |
| 2005/0017302 A1 | 1/2005 | Hoffman | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0279319 A1* | 12/2007 | Yamazaki et al. | 345/32 |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166475 A1* | 7/2008 | Jeong et al. | 427/126.3 |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0218573 A1 | 9/2009 | Koyama | |
| 2009/0278122 A1 | 11/2009 | Hosono et al. | |
| 2009/0280600 A1 | 11/2009 | Hosono et al. | |
| 2010/0065844 A1 | 3/2010 | Tokunaga | |
| 2010/0092800 A1 | 4/2010 | Itagaki et al. | |
| 2010/0109002 A1 | 5/2010 | Itagaki et al. | |
| 2010/0133525 A1* | 6/2010 | Arai et al. | 257/40 |
| 2012/0062561 A1 | 3/2012 | Koyama | |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2009-31523 | 2/2009 |
| WO | WO-2004/114391 | 12/2004 |

OTHER PUBLICATIONS

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters) , Jun. 26, 2007, vol. 90, No. 26, pp. 262106-1-262106-3.

Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.

Hayashi.R et al., "42.1: Invited Paper: Improved Amorphous In—Ga—Zn—O TFTS,", SID Digest '08 : SID International Symposium Digest of Technical Papers, May 20, 2008, vol. 39, pp. 621-624.

(56) References Cited

OTHER PUBLICATIONS

Prins.M et al., "A Ferroelectric Transparent Thin-Film Transistor,", Appl. Phys. Lett. (Applied Physics Letters), Jun. 17, 1996, vol. 68, No. 25, pp. 3650-3652.

Nakamura.M et al., "The phase relations in the In2O3—Ga2ZnO4—ZnO system at 1350° C,", Journal of Solid State Chemistry, Aug. 1, 1991, vol. 93, No. 2, pp. 298-315.

Kimizuka.N et al., "Syntheses and Single-Crystal Data of Homologous Compounds, In2O3(ZnO)m (m = 3, 4, and 5), InGaO3(ZnO)3, and Ga2O3(ZnO)m (m = 7,8,9, and 16) in the In2O3—ZnGa2O4—ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics), Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Osada.T et al., "15.2: Development of Driver-Integrated Panel using Amorphous In—Ga—Zn-Oxide TFT,", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline InGaO3(ZnO)5 films,", Appl. Phys. Lett. (Applied Physics Letters), Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous Gizo (Ga2O3—In2O3—ZnO) TFT,", SID Digest '08 : SID International Symposium Digest of Technical Papers, May 20, 2008, vol. 39, pp. 633-636.

Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDS,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing MOO3 as a Charge-Generation Layer,", Adv. Mater. (Advanced Materials), 2006, vol. 18, No. 3, pp. 399-342.

Tsuda.K et al., "Ultra Low Power Consumption Technologies for Mobile TFT-LCDs,", IDW '02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium—Gallium—Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits, 2008, vol. 43, No. 1, pp. 292-299.

Ohara.H et al., "Amorphous In—Ga—Zn—Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back Plane,", SID Digest '09 : SID International Symposium Digest of Technical Papers, May 31, 2009, pp. 280-283.

Lee.M et al., "15.4:Excellent Performance of Indium—Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.

Sakata.J et al., "Development of 4.0-In. AMOLED Display With Driver Circuit Using Amorphous In—Ga—Zn—Oxide TFTS,", IDW '09 : Proceedings of the 16th International Display Workshops, 2009, pp. 689-692.

Park.J et al., "Amorphous Indium—Gallium—Zinc Oxide TFTS and Their Application for Large Size AMOLED,", AM-FPD '08 Digest of Technical Papers, Jul. 2, 2008, pp. 275-278.

Park.S et al., "Challenge to Future Displays: Transparent AM-OLED Driven by Peald Grown ZnO TFT,", IMID '07 Digest, 2007, pp. 1249-1252.

Godo.H et al., "Temperature Dependence of Characteristics and Electronic Structure for Amorphous In—Ga—Zn—Oxide TFT,", AM-FPD '09 Digest of Technical Papers, Jul. 1, 2009, pp. 41-44.

Osada.T et al., "Development of Driver-Integrated Panel Using Amorphous In—Ga—Zn—Oxide TFT,", AM-FPD '09 Digest of Technical Papers, Jul. 1, 2009, pp. 33-36.

Hirao.T et al., "Novel Top-Gate Zinc Oxide Thin-Film Transistors (ZnO TFTS) for AMLCDS,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn—Oxide TFT,", SID Digest '09 : SID International Symposium Digest of Technical Papers, May 31, 2009, pp. 1110-1112.

Ohara.H et al., "21.3:4.0 In. QVGA AMOLED Display Using In—Ga—Zn—Oxide TFTS With a Novel Passivation Layer,", SID Digest '09 : SID International Symposium Digest of Technical Papers, May 31, 2009, pp. 284-287.

Miyasaka.M, "Suftla Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display

(56) References Cited

OTHER PUBLICATIONS

Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N et al., "Spinel,YBFE2O4, and YB2FE3O7 Types of Structures for Compounds in the In2O3 and Sc2O3-A2O3-BO Systems [A; Fe, Ga, or Al; B: Mg, Mn, Fe, Ni, Cu,or Zn] at Temperatures over 1000° C,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium—Gallium—Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies in ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B.(Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al.,"Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using Castep,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator,", Appl. Phys. Lett. (Applied Physics Letters) , Sep. 1, 2003, vol. 83, No. 9, pp. 1755-1757.

Kamiya.T et al., "Carrier transport properties and electronic structures of amorphous oxide semiconductors: the present status,", Solid State Physics, Sep. 1, 2009, vol. 44, No. 9, pp. 621-633, Agne Gijutsu Center.

* cited by examiner

DISPLAY DEVICE

BACKGROUND OF THE INVENTION

1. Field of the Invention

The present invention relates to display devices for displaying three-dimensional images.

2. Description of the Related Art

The market for display devices adapted to a three-dimensional image display has been growing. A difference of a retinal image between both eyes (binocular disparity), which would occur when we see a three-dimensional object by both eyes, is produced in the display device, whereby the three-dimensional image display can be performed. Three-dimensional-image display devices employing the binocular disparity, for which a variety of driving methods have been developed, have been commercialized. Current mainstream one in the market is a liquid crystal display device employing a frame sequential method.

The frame sequential method is a driving method in which an image for a left eye and an image for a right eye are displayed alternately on a screen and are seen through eyeglasses with shutters, which enables a viewer's eyes to recognize a three-dimensional image. Specifically, while the display device displays an image for the left eye, the eyeglasses increase the transmittance of the shutter for the left eye through which the image is sent to the left eye of the viewer; while the display device displays an image for the right eye, the eyeglasses increase the transmittance of the shutter for the right eye through which the image is sent to the right eye of the viewer. In this manner, the viewer sees the image for the left eye with his/her left eye and the image for the right eye with his/her right eye, thereby recognizing a three-dimensional image.

Patent Document 1 discloses a frame-sequential liquid crystal display device.

REFERENCE

Patent Document 1: Japanese Published Patent Application No. 2009-031523

SUMMARY OF THE INVENTION

In the above-described frame-sequential liquid crystal display device, an image for the left eye and an image for the right eye are mixed to be displayed in a pixel portion in a period during which image signal writing into the pixel portion is performed (a writing period). If the shutter for the right eye or the shutter for the left eye of the eyeglasses transmits light in the writing period, a phenomenon called crosstalk, that the image for the left eye is seen in his/her right eye or that the image for the right eye is seen in his/her left eye, occurs to disturb the recognition of the three-dimensional image. In order to avoid the crosstalk, it is effective to set the shutter for the right eye and the shutter for the left eye of the eyeglasses such that they both transmit no light in the writing period.

However, the response time of liquid crystals, from when the applied voltage is changed to when a change in alignment of liquid crystal molecules converges, is about ten and several milliseconds in general, whereas one frame period is about 16.6 msec when a liquid crystal display device is driven at a frame frequency of 60 Hz. Thus, the writing period accounts for a large part of one frame period. Therefore, the structure in which both the shutter for the right eye and the shutter for the left eye are set to transmit no light in the writing period in order to avoid the crosstalk results in a decrease in a period during which the eyeglasses transmit light from the pixel portion, which makes a displayed image dark. Further or alternatively, even if the brightness of the displayed image can be ensured by increasing the luminance of a backlight, the power consumption is increased.

In view of the forgoing, one object of one embodiment of the present invention is to provide a three-dimensional-image display device capable of displaying an image with a high brightness while suppressing power consumption.

The inventor of the present invention considers that the writing period can be decreased with a light emitting element such as an organic light emitting diode (OLED) whose response rate is higher than that of a liquid crystal element. However, simple replacement of the liquid crystal element with the light emitting element leads to increase of the possibility of occurrence of the crosstalk. The reason therefor is described below.

For the shutter of the eyeglasses, an element capable of controlling the transmittance by a supply of current or voltage, such as a liquid crystal element, has been used. With such a shutter, for example, in the case of a liquid crystal element in a normally black mode, the transmittance with no voltage applied is ideally 0%. However, the transmittance is not 0% actually in some cases depending on the wavelength of light; slight light may be transmitted through the shutter. Consequently, in the writing period during which an image for the left eye and an image for the right eye are mixed to be displayed in the pixel portion, crosstalk in which the image for the left eye is seen in his/her right eye or in which the image for the right eye is seen in his/her left eye, occurs slightly to disturb the recognition of a three-dimensional image.

In the case where the liquid crystal element is used for the pixel portion in a display device, a backlight may be turned off to prevent the slight light transmitted through the shutter in the writing period from being sent to a viewer's eyes. On the other hand, in the case where a light emitting element whose luminance is controlled by an image signal written is used in the pixel portion in a display device, an image for the left eye and an image for the right eye are mixed to be displayed in the pixel portion in the writing period; thus, more crosstalk tends to occur than the case of the liquid crystal element.

Further, in the case where the liquid crustal element is used as the shutter of the eyeglasses, due to its low response rate, it takes time to conclude the change of the transmittance from the time when the applied voltage is changed. Therefore, in order to avoid the crosstalk, it is important to make the shutters of the eyeglasses in the non-transmissive state and to prevent an image for the left eye and an image for the right eye from being mixed to be displayed in the pixel portion in the writing period.

In the case of using a liquid crystal element, writing of an image signal for a black display by which the light emitting element is turned off enables prevention of mixing of an image for the left eye and an image for the right eye in the pixel portion, so that occurrence of crosstalk can be suppressed. However, according to this driving method, it is necessary to switch respective transmittances of the shutters for the left and right eyes in a period from the end of the writing of the image signal for the black display in all the pixels in the pixel portion to the start of writing of an image signal for the left eye or an image signal for the right eye. Further, the writing period of the image signal for the black display takes time as long as the writing period of a normal image signal. Therefore, in the above-described driving method, in any given pixel, the light emitting element is off both in the period for switching the shutters and in the writing period of the image signal for the black display. Accordingly, the proportion of a light emitting period of the light emitting element in one frame period, that is, the duty ratio that is the proportion of a display period in one frame period is low, so that it is difficult to realize a display device which displays an image with a high brightness while suppressing power consumption, i.e., one object of one embodiment of the present invention.

In view of the above, the inventor of the present invention proposes to provide a switching element for controlling whether or not a current is supplied to the light emitting element regardless of the potential of the image signal, in the pixel. Specifically, a switching element is provided in the path of current supplied to the light emitting element, and is turned off to turn off the light emitting element. The use of the switching element makes it unnecessary to perform writing of an image signal for a black display in order to turn off the light emitting element. That is, light emitting elements in all the pixels can be turned off at the same time using a signal whose system is different from that of an image signal, whereby the light emitting elements can be off in the writing period of the image signal.

Specifically, a display device of one embodiment of the present invention includes an image display portion in which a plurality of pixels is provided in a pixel portion, a light-shielding portion including a first shutter and a second shutter, and a control portion for controlling the transmittances of the first shutter and the second shutter in synchronization with display of an image for the right eye or an image for the left eye in the pixel portion. The plurality of pixels includes a switching transistor for controlling an input of an image signal to the pixel, a light emitting element, a driving transistor for controlling the value of a current supplied to the light emitting element in accordance with the image signal, and a current controlling transistor for controlling whether or not the current is supplied to the light emitting element.

According to one embodiment of the present invention, a light emitting element is used, whereby the proportion of a writing period in one frame period can be decreased. Further, a current controlling transistor is provided in a pixel, whereby all of the light emitting elements in a pixel portion can be turned off in a writing period of an image signal for the right eye or an image signal for the left eye. Furthermore, respective transmittances of the shutters for the left and right eyes can be switched in the above-described writing period. Accordingly, the duty ratio that is the proportion of a display period in one frame period can be increased as compared to conventional display devices, while suppressing occurrence of crosstalk. Accordingly, a display device capable of displaying an image with a high brightness while suppressing power consumption can be achieved.

DETAILED DESCRIPTION OF THE INVENTION

Hereinafter, embodiments and an example of the present invention will be described in detail with reference to the accompanying drawings. However, the present invention is not limited to the following description and it is easily understood by those skilled in the art that the mode and details can be variously changed without departing from the scope and spirit of the present invention. Accordingly, the present invention should not be construed as being limited to the description of the embodiment modes and example below.

Embodiment 1

Figure 1:
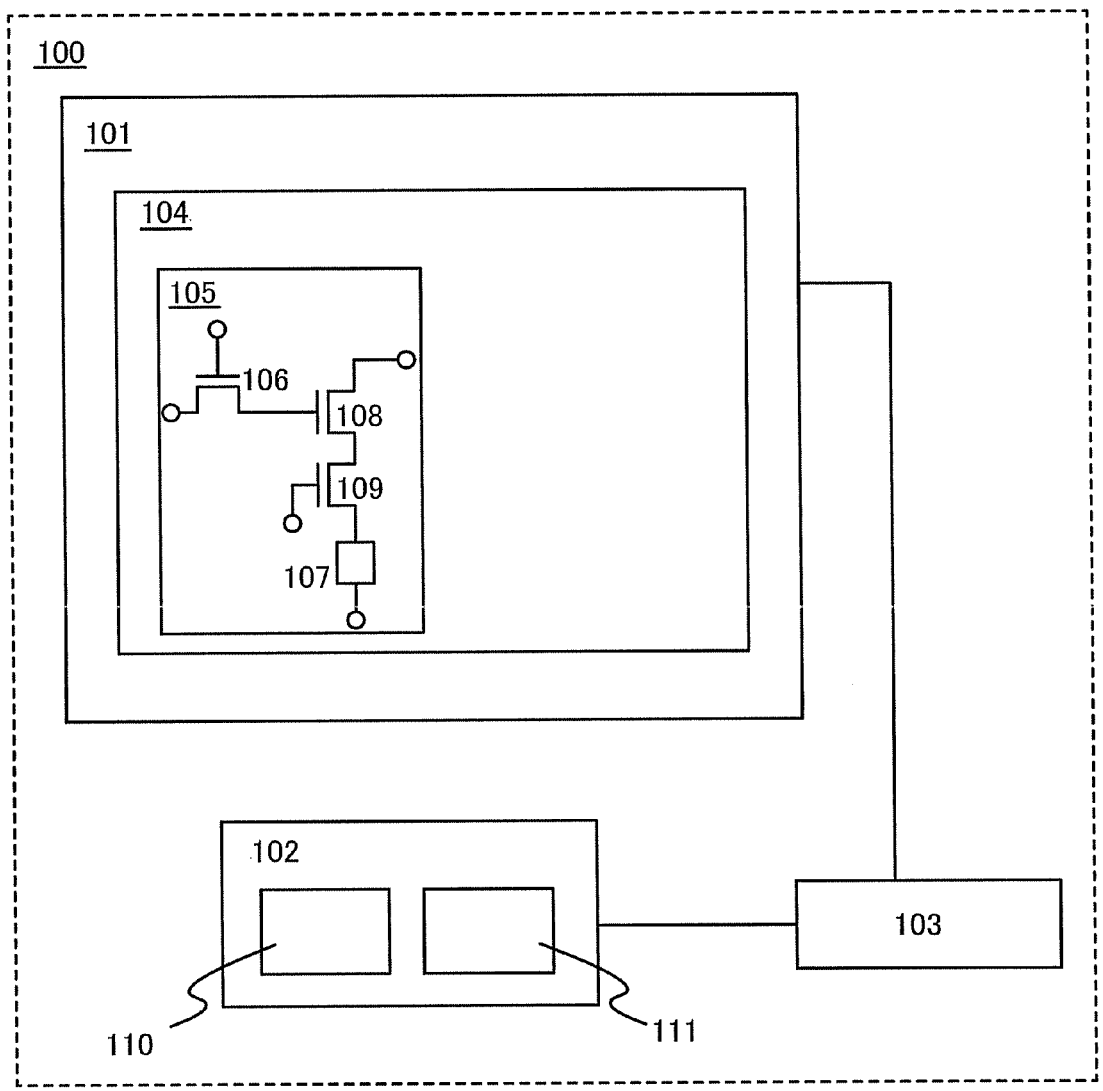
FIG. 1 is a block diagram of a structure of a display device.

FIG. 1 is a block diagram illustrating a structural example of a display device according to one embodiment of the present invention. A display device 100 includes an image display portion 101 for displaying an image, a light-shielding portion 102 including a plurality of shutters capable of changing the transmittance of light, and a control portion 103 for synthesizing an image display on the image display portion 101 with a change of the transmittances of the plurality of shutters.

The image display portion 101 includes a plurality of pixels 105 in a pixel portion 104. The pixel 105 includes a switching transistor 106 for controlling an input of an image signal to the pixel 105, a light emitting element 107, a driving transistor 108 for controlling the value of a current supplied to the light emitting element 107 in accordance with an image signal, and a current controlling transistor 109 for selecting whether or not current is supplied to the light emitting element 107.

The light emitting element 107 includes in its category an element whose luminance is controlled by current or voltage. For example, an OLED element or the like can be used as the light emitting element 107. An OLED element includes an anode, a cathode, and an electroluminescence layer containing an electroluminescent material that can provide luminescence (electroluminescence) generated by application of an electric field. The electroluminescence layer is provided between the anode and the cathode, and consists of a single layer or a plurality of layers. Such layers may include an inorganic compound. The luminescence in the electroluminescence layer includes light emission (fluorescence) in returning from a singlet excited state to the ground state, and light emission (phosphorescence) in returning from a triplet excited state to the ground state.

The luminescence of the light emitting element 107 is controlled in accordance with an image signal input to the pixel 105. In this manner, the luminances of the light emitting elements 107 in the plurality of pixels 105 in the pixel portion 104 are controlled in accordance with image signals, whereby an image is displayed in the pixel portion 104. Further, an image signal containing image data for the left eye and an image signal containing image data for the right eye are written alternately into the pixel portion 104, whereby an image for the left eye (an L image) and an image for the right eye (an R image) can be displayed alternately in the pixel portion 104.

FIG. 1 illustrates the case where the light-shielding portion 102 includes a shutter for the left eye 110 and a shutter for the right eye 111. The shutter for the left eye 110 changes its transmittance to limit the amount of light to enter the left eye of the user. The shutter for the right eye 111 changes its transmittance to limit the amount of light to enter the right eye of the user.

The shutter can be formed using an element capable of controlling the transmittance by a supply of current or voltage, such as a liquid crystal element. The shutter for the left eye 110 and the shutter for the right eye 111 may have liquid crystal panels independently from each other or share one liquid crystal panel. In the latter case, the transmittance of the liquid crystal panel may be controlled individually in the region for the shutter for the left eye 110 and in the region for the shutter for the right eye 111.

The panel in this specification means a substrate provided with a display, element such as a liquid crystal element or a light emitting element, and also includes in its category a module where an IC including a controller and the like are mounted on the substrate.

The control portion 103 synchronizes the operations of the image display portion 101 and the light-shielding portion 102 with each other such that the transmittance of the shutter for the left eye 110 is high and the transmittance of the shutter for the right eye 111 is low, preferably 0% in the period during which the L image is displayed in the pixel portion 104, and the transmittance of the shutter for the left eye 110 is low, preferably 0% and the transmittance of the shutter for the right eye 111 is high in the period during which the R image is displayed in the pixel portion 104. Further, the control portion 103 synchronizes the operations of the image display portion 101 and the light-shielding portion 102 with each other such that the transmittances of the shutter for the left eye 110 and the shutter for the right eye 111 are low, preferably 0% in the writing period during which an image signal for the L image or an image signal for the R image is written into the pixel portion 104.

According to the synchronization of operations of the image display portion 101 and the light-shielding portion 102 by the control portion 103 as described above, an L image can be seen in the left eye of the user and an R image can be seen in the right eye of the user, alternately. According to the above structure, the user can recognize a three-dimensional image which consists of the L image and the R image.

Described next is a connection between the switching transistor 106, the light emitting element 107, the driving transistor 108, and the current controlling transistor 109 included in the pixel 105.

In this specification, the "connection" means electrical connection and corresponds to the state in which current, voltage, or a potential can be supplied or transmitted. Therefore, the connection does not necessarily indicate a direct connection state and includes in its category an indirect connection state via an element such as a wiring, a conductive film, a resistor, a diode, or a transistor, in which current, voltage, or a potential can be supplied or transmitted.

In addition, among the cases where different components are connected to each other in a circuit diagram, there is actually a case where one conductive film has functions of a plurality of components such as a case where part of a wiring serves as an electrode. The connection in this specification includes in its category such a case where one conductive film has functions of a plurality of components.

The names of a "source electrode" and a "drain electrode" of the transistor interchange with each other depending on the polarity of the transistor or which level of the potentials applied to the electrodes is high. In general, in an n-channel transistor, an electrode to which a lower potential is applied is called a source electrode, and an electrode to which a higher potential is applied is called a drain electrode. Further, in a p-channel transistor, an electrode to which a lower potential is applied is called a drain electrode, and an electrode to which a higher potential is applied is called a source electrode. Description is made hereinafter in which one of the source electrode and the drain electrode is referred to as a first terminal and the other is referred to as a second terminal.

A potential of an image signal is supplied to a first terminal of the switching transistor 106, and a gate electrode of the driving transistor 108 is connected to a second terminal of the switching transistor 106. A first potential is supplied to a first terminal of the driving transistor 108, and a second terminal of the driving transistor 108 is connected to a first terminal of the current controlling transistor 109. A second terminal of the current controlling transistor 109 is connected to the light emitting element 107. The light emitting element 107 includes a pixel electrode, a common electrode, and an electroluminescence layer to which a current is supplied by the pixel electrode and the common electrode; specifically, the second terminal of the current controlling transistor 109 is connected to the pixel electrode of the light emitting element 107. A second potential is supplied to the common electrode of the light emitting element 107.

The first potential and the second potential have a potential difference therebetween by which a forward bias current is supplied between the pixel electrode and the common electrode of the light emitting element 107 when the driving transistor 108 and the current controlling transistor 109 are on.

One of the pixel electrode and the common electrode of the light emitting element 107 corresponds to an anode and the other corresponds to a cathode.

Although the current controlling transistor 109 is provided in the pixel 105 so as to be able to cut the current path between the second terminal of the driving transistor 108 and the pixel electrode of the light emitting element 107 in FIG. 1, an embodiment of the present invention is not limited to this structure. The current controlling transistor 109 may be provided in the pixel 105 so as to be able to cut the current path between the first terminal of the driving transistor 108 and the node to which the first potential is supplied.

Further, either an n-channel transistor or a p-channel transistor can be used as any of the switching transistor 106, the driving transistor 108, and the current controlling transistor 109.

Further, although a storage capacitor is not provided in the pixel 105 in FIG. 1, a storage capacitor for holding the potential of the image signal may be connected to the gate electrode of the driving transistor 108.

Further, any of the switching transistor 106, the driving transistor 108, and the current controlling transistor 109 may include a wide-gap semiconductor such as an oxide semiconductor in the active layer, and may be formed using an amorphous, microcrystalline, polycrystalline, or single crystal semiconductor of silicon, germanium, or the like.

The oxide semiconductor has a wider bandgap than silicon and a lower intrinsic carrier density than silicon; thus with the use of an oxide semiconductor for the active layer of a transistor, a transistor whose off-state current is extremely lower than that of a general transistor using a semiconductor such as silicon or germanium for the active layer can be formed.

Note that a highly purified oxide semiconductor obtained by reduction of impurities such as moisture or hydrogen which serves as an electron donor (donor) and by reduction of oxygen defects is an intrinsic (i-type) semiconductor or a substantially i-type semiconductor. Therefore, a transistor using the oxide semiconductor has a characteristic of very small off-state current. Specifically, the hydrogen concentration in the highly purified oxide semiconductor which is measured by secondary ion mass spectrometry (SIMS) is less than or equal to $5 \times 10^{19}/cm^3$, preferably less than or equal to $5 \times 10^{18}/cm^3$, further preferably less than or equal to $5 \times 10^{17}/cm^3$, still further preferably less than or equal to $1 \times 10^{16}/c^3$. In addition, the carrier density of the oxide semiconductor film, which is measured by Hall effect measurement, is less than $1 \times 10^{14}/cm^3$, preferably less than $1 \times 10^{12}/cm^3$, further preferably less than $1 \times 10^{11}/cm^3$. Furthermore, the bandgap of the oxide semiconductor is 2 eV or more, preferably 2.5 eV or more, further preferably 3 eV or more. The oxide semiconductor film which is highly purified by sufficiently reducing the concentration of impurities such as moisture or hydrogen and by reducing oxygen defects leads to a reduction of the off-state current of the transistor.

The analysis of the hydrogen concentration in the oxide semiconductor film is described here. The hydrogen concentration in the oxide semiconductor layer is measured by secondary ion mass spectroscopy (SIMS). It is known that it is difficult to obtain data in the proximity of a surface of a sample or in the proximity of an interface between stacked films formed of different materials by the SIMS in principle. Thus, in the case where the distribution of the hydrogen concentration of the film in a thickness direction is analyzed by SIMS, an average value in a region of the film, in which the value is not greatly changed and almost the same value can be obtained is employed as the hydrogen concentration. Further, in the case where the thickness of the film is small, a region where almost the same value can be obtained cannot be found in some cases due to the influence of the hydrogen concentration of the film adjacent to that film. In that case, the maximum value or the minimum value of the hydrogen concentration in the region of the film is employed as the hydrogen concentration of the film. Further, in the case where a mountain-shaped peak having the maximum value or a valley-shaped peak having the minimum value do not exist in the region of the film, the value at the inflection point is employed as the hydrogen concentration.

It can be proved through various experiments that the off-state current of the transistor using the highly-purified oxide semiconductor film as an active layer is low. For example, even when an element has a channel width of $1 \times 10^6$ μm and a channel length of 10 μm, off-state current can be less than or equal to the measurement limit of a semiconductor parameter analyzer, i.e., less than or equal to $1 \times 10^{-13}$ A, at voltage (drain voltage) between the source electrode and the drain electrode of from 1 V to 10 V. In that case, it can be found that an off-state current density corresponding to a value obtained by dividing the off-state current by the channel width of the transistor is less than or equal to 100 zA/μm. Further, the off-state current density was measured with the use of a circuit in which a capacitor and a transistor are connected to each other and charge that flows in or out from the capacitor is controlled by the transistor. In the measurement, the highly-purified oxide semiconductor film was used as a channel formation region in the transistor, and the off-state current density of the transistor was measured from change in the amount of electric charge of the capacitor per unit time. As a result, it was found that at a voltage between the source electrode and the drain electrode of the transistor of 3 V, a lower off-state current density of several tens yoctoampere per micrometer (yA/μm) was able to be obtained. Thus, in the semiconductor device according to one embodiment of the present invention, the off-state current density of the transistor in which the highly purified oxide semiconductor film is used as an active layer can be reduced to less than or equal to 100 yA/μm, preferably less than or equal to 10 yA/μm, further preferably less than or equal to 1 yA/μm depending on the voltage between the source electrode and the drain electrode. Accordingly, the transistor using the highly-purified oxide semiconductor film as an active layer has much lower off-state current than a transistor using silicon having crystallinity.

As the oxide semiconductor, any of the following can be used: an indium oxide; a tin oxide; a zinc oxide; a two-component metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide; a three-component metal oxide such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; a four-component metal oxide such as an In—Sn—Ga—Zn-based oxide semiconductor, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide. The above oxide semiconductor may contain silicon.

In this specification, an In—Ga—Zn-based oxide means, for example, an oxide including In, Ga, and Zn, and there is no limitation on the ratio of In:Ga:Zn. Further, the In—Ga—Zn-based oxide may contain a metal element other than In, Ga, and Zn. An In—Ga—Zn-based oxide has sufficiently high resistance when there is no electric field and thus can sufficiently reduce the off-state current, and has high field-effect mobility, so that the In—Ga—Zn-based oxide is suitable as a semiconductor material used in a solid-state image sensing device or a semiconductor display device.

As the oxide semiconductor, a material expressed by the chemical formula $InMO_3(ZnO)_m$ (m>0) may be used. Here, M represents one or more metal elements selected from Ga, Al, Mn, and Co. For example, M may be Ga, Ga and Al, Ga and Fe, Ga and Ni, Ga and Mn, Ga and Co, or the like. Alternatively, as the oxide semiconductor, a material expressed by the chemical formula $In_3SnO_5(ZnO)_n$ (n>0, n is an integer) may be used. Note that the above-described compositions are derived from the crystal structure and are just examples.

Unless otherwise specified, in the case of an n-channel transistor, off-state current in this specification is current which flows between a source electrode and a drain electrode when the potential of a gate electrode is less than or equal to zero with respect to the potential of the source electrode as a reference potential in the case where the potential of the drain electrode is higher than that of the source electrode and that of the gate electrode. Further, in this specification, in the case of a p-channel transistor, an off-state current is current which flows between a source electrode and a drain electrode when the potential of a gate electrode is greater than or equal to zero with respect to the potential of the source electrode as a reference potential in the case where the potential of the drain electrode is lower than that of the source electrode and that of the gate electrode.

By using an oxide semiconductor for the active layer of the switching transistor 106, the off-state current of the transistor can be reduced. The reduction in the off-state current of the switching transistor 106 can lead to a reduction in the leakage amount of charge from the gate electrode of the driving transistor 108. Accordingly, the potential of an image signal can be held even when the storage capacitor for holding the potential of an image signal is reduced in size or omitted, so that the aperture ratio can be increased in the case where light is extracted from the pixel electrode side of the light emitting element 107 and thus light extraction efficiency can be increased.

As one example of a semiconductor material which has a wider bandgap than silicon and has a lower intrinsic carrier density than silicon, a compound semiconductor such as silicon carbide (SiC) or gallium nitride (GaN) can be given in addition to an oxide semiconductor. The oxide semiconductor advantages in the mass productivity because it can be manufactured by a sputtering method or a wet process, unlike the compound semiconductor such as silicon carbide or gallium nitride. Further, unlike silicon carbide or gallium nitride, the oxide semiconductor can be formed at room temperature, whereby the oxide semiconductor can be formed on a glass substrate or on an integrated circuit using silicon. Therefore, the oxide semiconductor has particularly an advantage of high mass productivity over the above-described silicon carbide or gallium nitride. Further, when an oxide semiconductor with crystallinity is formed in order to improve the performance (e.g., field-effect mobility) of a transistor, the crystalline oxide semiconductor can be easily obtained by heat treatment at 250° C. to 800° C.

Further, the oxide semiconductor has higher mobility than amorphous silicon, which allows application to a large-sized substrate of the 6th generation or more, unlike polycrystalline silicon or microcrystalline silicon.

The switching transistor 106 and the current controlling transistor 109 operate in the liner region and thus function as switching elements. Therefore, the number of the switching transistors 106 is not limited to one; a plurality of switching transistors 106 connected in parallel or in series may be provided in the pixel 105. Similarly, the number of the current controlling transistors 109 is not limited to one; a plurality of current controlling transistors 109 connected in parallel or in series may be provided in the pixel 105.

In this specification, the state where transistors are connected to each other in series means, for example, the state where only one of a first terminal and a second terminal of the first transistor is connected to only one of a first terminal and a second terminal of the second transistor. Further, the state where transistors are connected to each other in parallel means a state where a first terminal of the first transistor is connected to a first terminal of the second transistor and a second terminal of the first transistor is connected to a second terminal of the second transistor.

Each of the switching transistor 106, the driving transistor 108, and the current controlling transistor 109 includes at least a gate electrode provided on one side of the active layer, and may include a pair of gate electrodes provided on both sides of the active layer. Further, any of the switching transistor 106, the driving transistor 108, and the current controlling transistor 109 may have a single gate structure in which a single gate electrode and a single channel foimation region are provided or a multi-gate structure in which a plurality of gate electrodes electrically connected to each other is provided and thus a plurality of channel formation regions are formed.

Figure 2A:
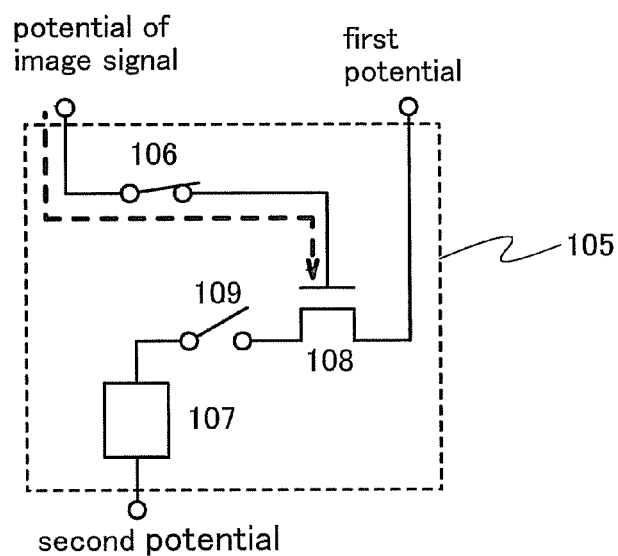
FIGS. 2A and 2B are circuit diagrams of a pixel.
Figure 2B:
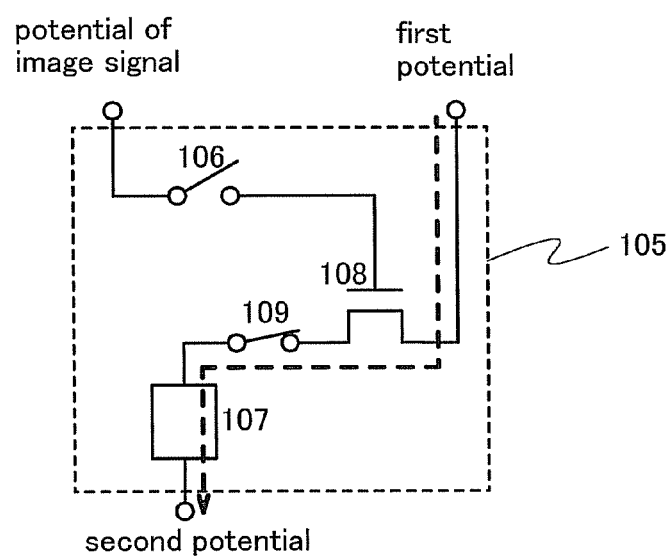

Next, an operation of the pixel 105 is described using FIGS. 2A and 2B. In the circuit diagrams in FIGS. 2A and 2B, the switching transistor 106 and the current controlling transistor 109 which function as switching elements are shown as switches.

FIG. 2A illustrates schematically an operation of the pixel 105 in data writing. When an image signal is written into the pixel 105, the switching transistor 106 is turned on and the current controlling transistor 109 is turned off. Thus, a potential of the image signal is supplied to the gate electrode of the driving transistor 108 through the switching transistor 106 as indicated by a dotted line. The resistance value between the source electrode and the drain electrode of the driving transistor 108 is determined in accordance with a difference between the potential of the source electrode and the potential of the gate electrode (the difference is a gate voltage) with respect to the potential of the source electrode used as a reference. In that time, since the current controlling transistor 109 is off, a current supply to the light emitting element 107 is stopped, whereby the light emitting element 107 is off. Upon completion of the writing of the image signal, both the switching transistor 106 and the current controlling transistor 109 are turned off.

Next, an image display is performed in accordance with the written image signal. FIG. 2B illustrates schematically an operation of the pixel 105 in displaying an image. When an image is displayed in the pixel 105, the switching transistor 106 is turned off and the current controlling transistor 109 is turned on. By turning off the switching transistor 106, the potential supplied to the gate electrode of the driving transistor 108 is held. Then, with a potential difference between the first potential and the second potential, a current is supplied to the light emitting element 107 through the current controlling transistor 109 which is on, as indicated by a dotted line. The value of the current supplied to the light emitting element 107 is determined in accordance with the resistance value between the source electrode and the drain electrode of the driving transistor 108. Further, the luminance of the light emitting element 107 is determined by the value of the current. Accordingly, the luminance of the light emitting element 107 is determined in accordance with the potential of the image signal.

The above-described writing operation is performed per line pixel. A line pixel means a group of pixels whose gate electrodes of the switching transistors 106 are connected to each other. A period which is taken to write image signals into all the pixels 105 in the pixel portion 104 per line pixel corresponds to a writing period. Then, the displaying operation is performed at the same time in all the pixels.

Next, a method of synchronizing an operation of the pixel portion 104 in the image display portion 101 and operations of the shutter for the left eye 110 and the shutter for the right eye 111 in the light-shielding portion 102 in a display device according to one embodiment of the present invention is described below.

Figure 3:
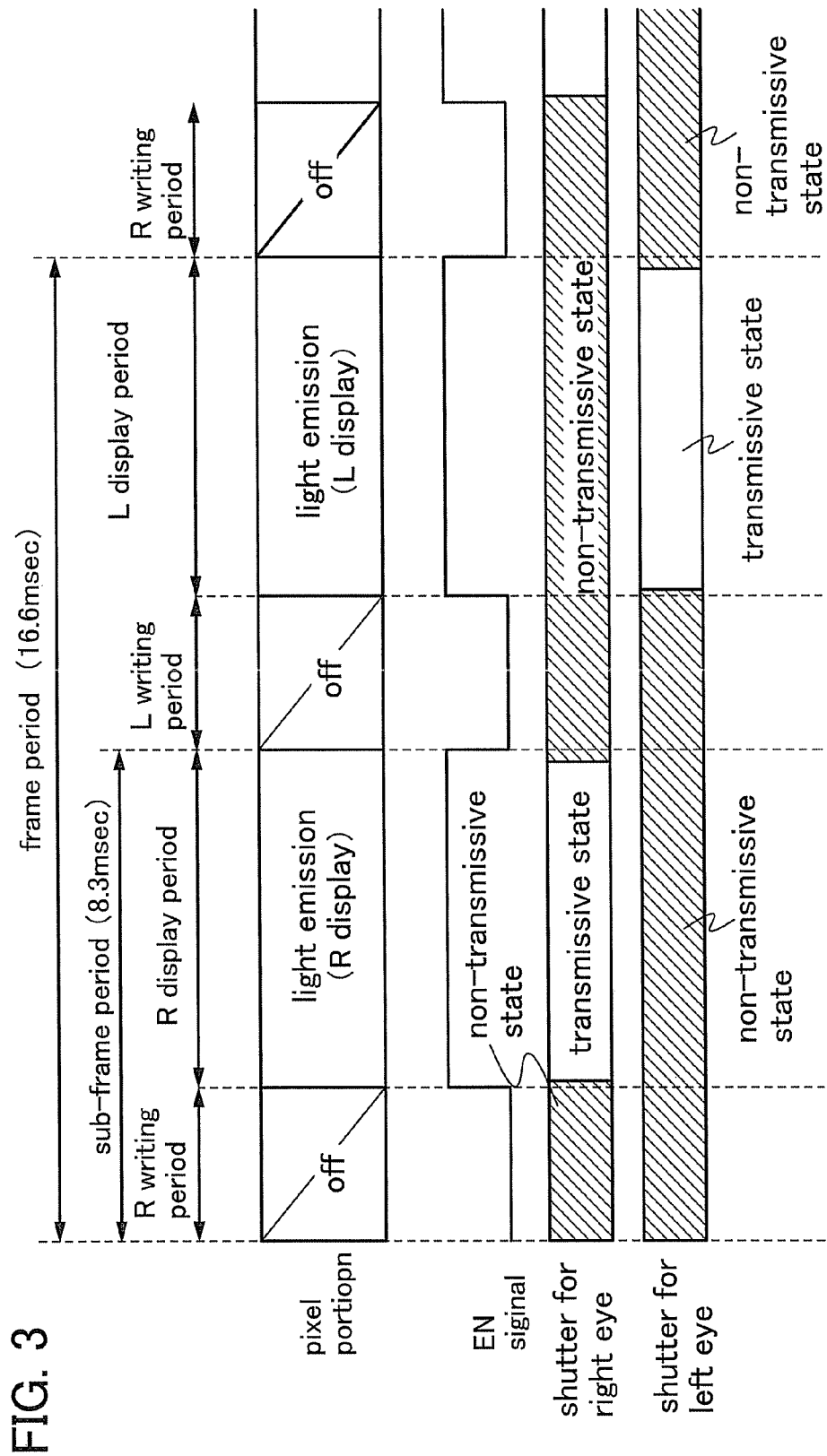
FIG. 3 is a timing chart of operation of a display device.

In FIG. 3, an operation of the light emitting element 107 in the pixel portion 104, the potential of an EN signal which controls switching of the current controlling transistor 109, and operations of the shutter for the left eye 110 and the shutter for the right eye 111 are illustrated in, as an example, a timing chart. The potential of the EN signal in the case where the current controlling transistor 109 is an n-channel transistor is shown in FIG. 3.

First, a writing period of an image signal for an R image (an R writing period) is started, in which the image signal is written into the pixel 105 per line in the pixel portion 104. In the R writing period, the potential of the EN signal is at a low level to turn off the current controlling transistors 109 in all the pixels 105, whereby all of the light emitting elements 107 are off.

In addition, in the R writing period, the transmittance of the shutter for the left eye 110 and the transmittance of the shutter for the right eye 111 are decreased to make both the shutters into the non-transmissive state.

Next, a display period of the R image (an R display period) is started. In the R display period, the potential of the EN signal is at a high level to turn on the current controlling transistors 109 in all the pixels 105. Consequently, the light emitting elements 107 emit light in accordance with the image signals for the R image written into the pixels 105, whereby the R image is displayed (R display is performed).

In the above-described R display period, the transmittance of the shutter for the right eye 111 is increased to make the shutter in the transmissive state. On the other hand, the transmittance of the shutter for the left eye 110 remains to be low, which keeps the shutter in the non-transmissive state. Consequently, light from the pixel portion 104 passes through the shutter for the right eye 111, so that the R image displayed in the pixel portion 104 is seen selectively in the right eye of the user.

Figure 6A:
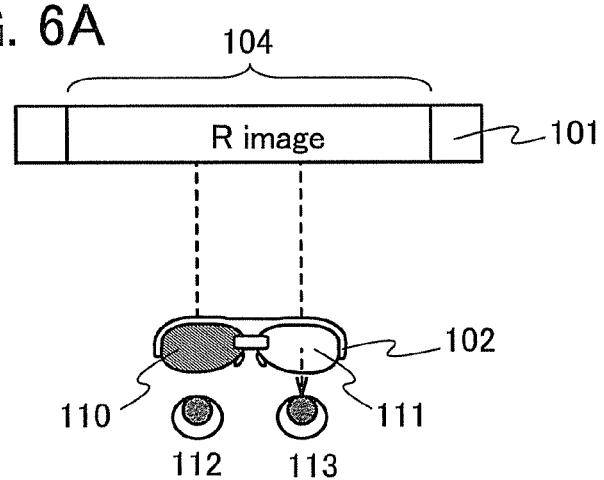
FIGS. 6A to 6C illustrate positional relationships between a pixel portion, a light-shielding portion, and the user's left eye and right eye.

FIG. 6A shows a positional relationship between the pixel portion 104 in the image display portion 101, the light-shielding portion 102, and a user's left eye 112 and a user's right eye 113. The shutter for the left eye 110 is provided in the path of light from the pixel portion 104 to the user's left eye 112. The shutter for the right eye 111 is provided in the path of light from the pixel portion 104 to the user's right eye 113.

A state of the display device in the R display period is also illustrated in FIG. 6A. In FIG. 6A, the shutter for the right eye 111 is in the transmissive state and the shutter for the left eye 110 is in the non-transmissive state. Therefore, as indicated by a dotted line, light from the pixel portion 104 does not pass through the shutter for the left eye 110 but passes through the shutter for the right eye 111 to enter the right eye 113. Accordingly, the user sees the R image displayed in the pixel portion 104 in the right eye 113.

Next, a writing period of an image signal for an L image (an L writing period) is started, in which the image signal is written into the pixel 105 per line in the pixel portion 104. In the L writing period, the potential of the EN signal is at a low level to turn off the current controlling transistors 109 in all the pixels 105, whereby all of the light emitting elements 107 are off.

In addition, in the L writing period, the transmittance of the shutter for the left eye 110 and the transmittance of the shutter for the right eye 111 are decreased to make both the shutters into the non-transmissive state.

Figure 6B:
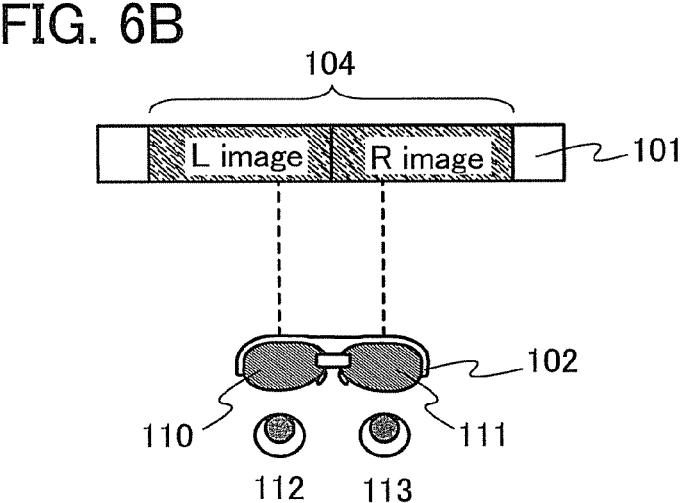

A state of the display device in the L writing period is illustrated in FIG. 6B. In FIG. 6B, the shutter for the right eye 111 and the shutter for the left eye 110 are in the non-transmissive state. Therefore, the paths of light from the pixel portion 104 to the user's left eye 112 and the user's right eye 113 are cut by the shutter for the left eye 110 and the shutter for the right eye 111. Further, in the L writing period, all of the light emitting elements in the pixel portion 104 are off. Therefore, even when the transmittances of the shutter for the left eye 110 and the shutter for the right eye 111 are not completely 0%, a mixed image of the L image and the R image is not seen in the user's left eye 112 and the user's right eye 113.

Next, a display period of the L image (an L display period) is started. In the L display period, the potential of the EN signal is at a high level to turn on the current controlling transistors 109 in all the pixels 105. Consequently, the light emitting elements 107 emit light in accordance with the image signals for the L image written into the pixels 105, whereby the L image is displayed (L display is performed).

In the above-described L display period, the transmittance of the shutter for the left eye 110 is increased to make the shutter in the transmissive state. On the other hand, the transmittance of the shutter for the right eye 111 remains to be low, which keeps the shutter in the non-transmissive state. Consequently, light from the pixel portion 104 passes through the shutter for the left eye 110, so that the L image displayed in the pixel portion 104 is seen selectively in the left eye of the user.

Figure 6C:
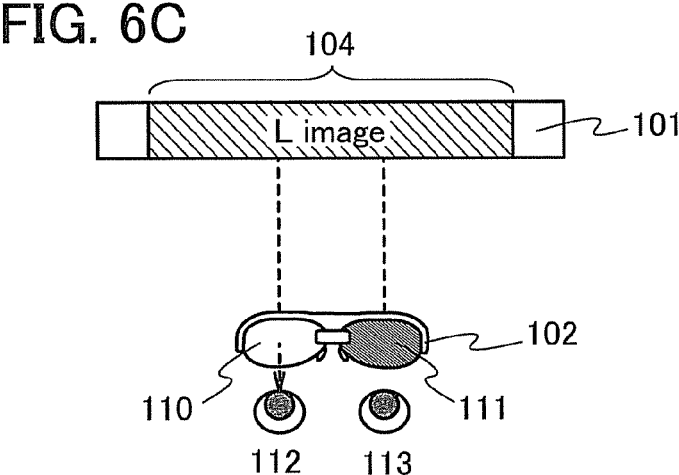

A state of the display device in the L display period is illustrated in FIG. 6C. In FIG. 6C, the shutter for the left eye 110 is in the transmissive state and the shutter for the right eye 111 is in the non-transmissive state. Therefore, as indicated by a dotted line, light from the pixel portion 104 does not pass through the shutter for the right eye 111 but passes through the shutter for the left eye 110 to enter the left eye 112. Accordingly, the user sees the L image displayed in the pixel portion 104 in the left eye 112.

The luminance of light emission of the light emitting element in the display period is controlled by the potential of the image signal. Therefore, although the light emitting elements emit light in the R display period and the L display period in FIG. 3, there is a case where part or all of the light emitting elements emit(s) no light depending on the image signal.

Through the above operations, the user can recognize a three-dimensional image which consists of the L image and the R image.

A period for performing display of the L image and the R image, that is, a period which is a sum of the R writing period, the R display period, the L writing period, and the L display period corresponds to one frame period. Therefore, for example, in the case where the pixel portion is driven at a frame frequency of 60 Hz, one frame period is about 16.6 msec. Further, in the case where a period which is a sum of the R writing period and the R display period, or a period which is a sum of the L writing period and the L display period corresponds to one sub-frame period, the above sub-frame period is about 8.3 msec.

Figure 4:
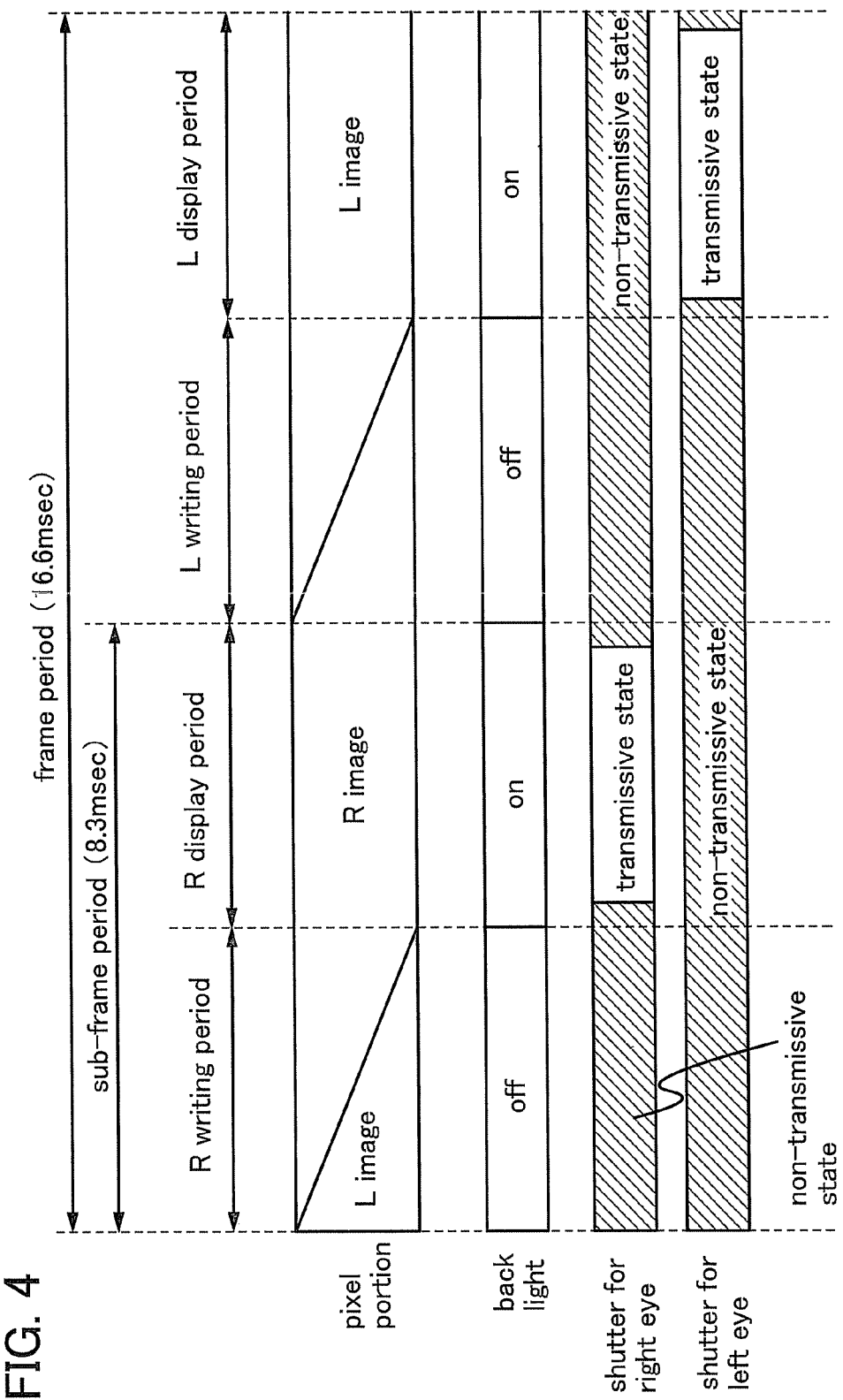
FIG. 4 is a timing chart of operation of a liquid crystal display device.

Next, an operation example of a liquid crystal display device is given, with which an operation of a display device according to one embodiment of the present invention is compared. In FIG. 4, an operation of a liquid crystal element in a pixel portion of the liquid crystal display device, an operation of a backlight, and operations of a shutter for the left eye and a shutter for the right eye are illustrated in, as an example, a timing chart.

In the liquid crystal display device, first, a writing period of an image signal for an R image (an R writing period) is started, in which the image signal is written into the pixel per line in the pixel portion. The transmittance of the light crystal element is controlled in accordance with the image signal for the R image written into the pixel. However, in the R writing period, the backlight is off, so that display of the R image is not performed.

In addition, in the R writing period, the transmittance of the shutter for the left eye and the transmittance of the shutter for the right eye are decreased to make both the shutters into the non-transmissive state.

Next, a display period of the R image (an R display period) is started. In the R display period, the backlight is on. The transmittance of the light emitting element is controlled in accordance with the image signal for the R image. Consequently, with the backlight which is on, the R image is displayed in the pixel portion.

In the above-described R display period, the transmittance of the shutter for the right eye is increased to make the shutter in the transmissive state. On the other hand, the transmittance of the shutter for the left eye remains to be low, which keeps the shutter in the non-transmissive state. Consequently, light from the pixel portion passes through the shutter for the right eye, so that the R image displayed in the pixel portion is seen selectively in the right eye of the user.

Next, a writing period of an image signal for an L image (an L writing period) is started, in which the image signal is written into the pixel per line in the pixel portion. The transmittance of the light crystal element is controlled in accordance with the image signal for the L image written into the pixel. However, in the L writing period, the backlight is off, so that display of the L image is not performed.

In addition, in the L writing period, the transmittance of the shutter for the left eye and the transmittance of the shutter for the right eye are decreased to make both the shutters into the non-transmissive state.

Next, a display period of the L image (an L display period) is started. In the L display period, the backlight is on. The transmittance of the light emitting element is controlled in accordance with the image signal for the L image. Consequently, with the backlight which is on, the L image is displayed in the pixel portion.

In the above-described L display period, the transmittance of the shutter for the left eye is increased to make the shutter in the transmissive state. On the other hand, the transmittance of the shutter for the right eye remains to be low, which keeps the shutter in the non-transmissive state. Consequently, light from the pixel portion passes through the shutter for the left eye, so that the L image displayed in the pixel portion is seen selectively in the left eye of the user.

Through the above operations, the user can recognize a three-dimensional image which consists of the L image and the R image.

Also in the above-described liquid crystal display device, a period for performing display of the L image and the R image, that is, a period which is a sum of the R writing period, the R display period, the L writing period, and the L display period corresponds to one frame period. Therefore, for example, in the case where the pixel portion is driven at a frame frequency of 60 Hz, one frame period is about 16.6 msec. Further, in the case where a period which is a sum of the R writing period and the R display period, or a period which is a sum of the L writing period and the L display period corresponds to one sub-frame period, the above sub-frame period is about 8.3 msec.

In the case of the liquid crystal display device, since the response rate of the liquid crystal element in the pixel is lower than that of the light emitting element, it is necessary that the R writing period and the L writing period are set longer than those of the display device shown in FIG. 3. Accordingly, in the same length of the sub-frame period, the R display period and the L display period are longer in the display device according to one embodiment of the present invention than those of the liquid crystal display device, and thus the duty ratio is higher in the display device according to one embodiment of the present invention, which leads to a display of an image with a high brightness while suppressing power consumption.

Next, an operation example of a display device which is the same as one embodiment of the present invention in that a light emitting element is provided in a pixel but is different in that a current controlling transistor is not provided in the pixel is given, with which the operation of the display device according to one embodiment of the present invention is compared.

Figure 5:
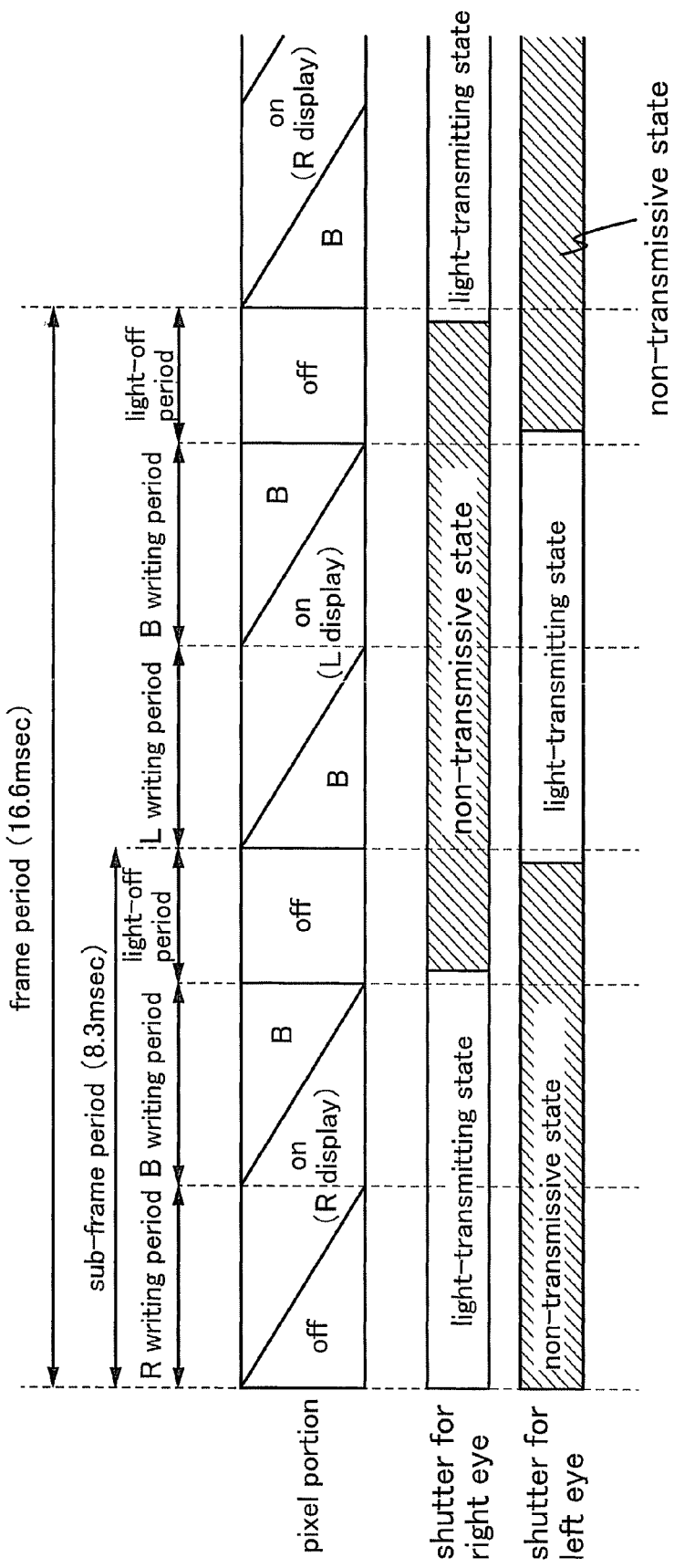
FIG. 5 is a timing chart of operation of a display device of a comparison example.

In FIG. 5, as for the display device which is a comparison example, an operation of a light emitting element in a pixel portion and operations of a shutter for the left eye and a shutter for the right eye are illustrated in, as an example, a timing chart.

In the display device which is a comparison example, first, a writing period of an image signal for an R image (an R writing period) is started, in which the image signal is written into the pixel per line in the pixel portion. Then, the light emitting element emits light in accordance with the image signal for the R image written into the pixel, whereby the R image is displayed (R display is performed) in the pixel portion. That is, the image signal is written into the pixel while the image is displayed; thus, the R writing period is part of an R display period. FIG. 5 illustrates a case where the R writing period is equal to the R display period.

Next, in the display device which is a comparison example, a writing period of an image signal for a black display by which the light emitting element is turned off (a B writing period) is started, in which the image signal for the black display is written into the pixel per line in the pixel portion. Then, the light emitting element is turned off in accordance with the image signal for the black display written into the pixel.

In the above-described R writing period and B writing period, the transmittance of the shutter for the right eye is increased to make the shutter in the transmissive state. On the other hand, the transmittance of the shutter for the left eye is decreased to make the shutter in the non-transmissive state. Consequently, light from the pixel portion passes through the shutter for the right eye, so that the R image displayed in the pixel portion is seen selectively in the right eye of the user.

Next, after the B writing period, a light-off period during which the light emitting elements in all the pixels in the pixel portion are turned off is provided in order to prevent the R image and the L image from being mixed to be displayed in the pixel portion. In the light-off period, the transmittances of the shutter for the left eye and the shutter for the right eye are decreased to make the shutters in the non-transmissive state.

Next, a writing period of an image signal for an L image (an L writing period) is started, in which the image signal is written into the pixel per line in the pixel portion. Then, the light emitting element emits light in accordance with the image signal for the L image written into the pixel, whereby the L image is displayed (L display is performed) in the pixel portion. That is, the image signal is written into the pixel while the image is displayed; thus, the L writing period is part of an L display period. FIG. 5 illustrates a case where the L writing period is equal to the L display period.

Next, the B writing period is started again, in which the image signal for the black display is written into the pixel per line in the pixel portion. Then, the light emitting element is turned off in accordance with the image signal for the black display written into the pixel.

In the above-described L writing period and B writing period, the transmittance of the shutter for the left eye is increased to make the shutter in the transmissive state. On the other hand, the transmittance of the shutter for the right eye is decreased to make the shutter in the non-transmissive state. Consequently, light from the pixel portion passes through the shutter for the left eye, so that the L image displayed in the pixel portion is seen selectively in the left eye of the user.

Next, after the B writing period, a light-off period during which the light emitting elements in all the pixels in the pixel portion are turned off is provided in order to prevent the R image and the L image from being mixed to be displayed in the pixel portion. In the light-off period, the transmittances of the shutter for the left eye and the shutter for the right eye are decreased to make the shutters in the non-transmissive state.

As described above, the luminance of light emission of the light emitting element in the display period is controlled by the potential of the image signal. Therefore, although the light emitting elements emit light in the R display period and the L display period, that is, in the R writing period and the L writing period in FIG. 5, there is a case where part or all of the light emitting elements emit(s) no light depending on the image signal.

Through the above operations, the user can recognize a three-dimensional image which consists of the L image and the R image.

In the above-described display device which is a comparison example, a period for performing display of the L image and the R image, that is, a period which is a sum of the R writing period, the B writing period, the light-off period, the L writing period, the B writing period, and the light-off period corresponds to one frame period. Therefore, for example, in the case where the pixel portion is driven at a frame frequency of 60 Hz, one frame period is about 16.6 msec. Further, in the case where a period which is a sum of the R writing period and the R display period, or a period which is a sum of the L writing period and the L display period corresponds to one sub-frame period, the above sub-frame period is about 8.3 msec.

In the above-described display device which is a comparison example, since the light emitting element is used as a display element like the display device according to one embodiment of the present invention, the R writing period and the L writing period take almost the same time as those in the display device according to one embodiment of the present invention. However, in the above-described display device which is a comparison example, in the light-off period between the B writing period and the L writing period, it is necessary to switch the transmittances of the shutter for the right eye and the transmittances of the shutter for the left eye. It takes time to switch the transmittances of the shutters because an element whose transmittance is controlled by a supply of current or voltage, such as a liquid crystal element is used as each shutter. Therefore, in the above-described display device which is a comparison example, in any given pixel, the light emitting element is off both in the light-off period for switching the shutters and in the writing period of the image signal for the black display. Accordingly, the proportion of a light emitting period of the light emitting element in one frame period, that is, the duty ratio that is the proportion of a display period in one frame period is low, so that it is difficult to realize a display device which displays an image with a high brightness while suppressing power consumption, i.e., one object of one embodiment of the present invention.

On the other hand, in the display device according to one embodiment of the present invention, the use of the current controlling transistor 109 allows the writing of the image signal for the black display for turning off the light emitting element 107 to be omitted. That is, light emitting elements in all the pixels can be turned off at the same time using a signal whose system is different from that of an image signal, whereby all of the light emitting elements 107 can be turned off at the same time in the R writing period and the L writing period. In the writing period, the pixel 105 into which an image signal has already been written and the pixel 105 into which the image signal has not been written yet are mixed in the pixel portion 104. That is, if the current controlling transistors 109 are on, the L image and the R image are mixed to be displayed in the pixel portion 104. However, according to one embodiment of the present invention, the light emitting elements 107 are off in the writing period, thereby preventing the L image and the R image from being mixed to be displayed in the pixel portion 104.

Further, according to one embodiment of the present invention, the transmittances of the shutter for the left eye and the shutter for the right eye can be switched in the writing period. Accordingly, the duty ratio that is the proportion of a display period in one frame period can be increased while suppressing occurrence of crosstalk, as compared to the display device which is a comparison example. Accordingly, a display device which displays an image with a high brightness while suppressing power consumption can be realized.

Further, according to one embodiment of the present invention, in the writing period, a mixed image of the L image and the R image is not displayed in the pixel portion 104, whereby crosstalk, the phenomenon that an image for the left eye is seen in the right eye or that an image for the right eye is seen in the left eye, can be avoided.

Further, the light emitting element 107 is turned off in the writing period, so that power consumption of the image display portion 101 and thus of the display device 100 can be reduced.

Embodiment 2

Figure 7:
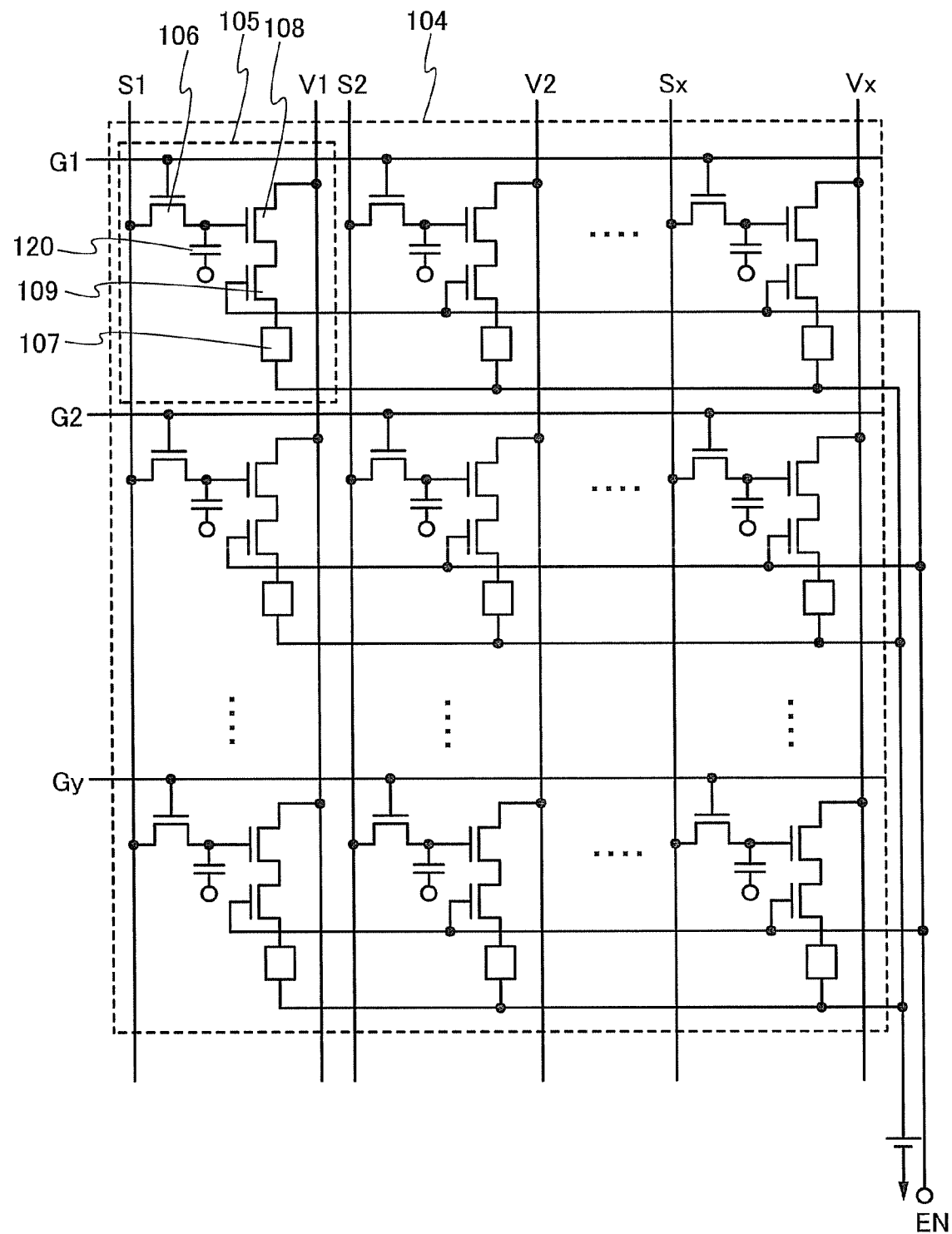
FIG. 7 illustrates one example of a specific circuit diagram of a pixel portion.

FIG. 7 illustrates an example of a specific circuit diagram of the pixel portion 104 including the plurality of pixels 105 shown in FIG. 1.

As shown in FIG. 7, the pixel portion 104 has signal lines S1 to Sx, scan lines G1 to Gy, and power supply lines V1 to Vx. The pixel 105 has one of the signal lines S1 to Sx, one of the scan lines G1 to Gy, and one of the power supply lines V1 to Vx.

In addition, in the pixel 105, a gate electrode of the switching transistor 106 is connected to the scan line Gj (j is one of 1 to y). A first terminal of the switching transistor 106 is connected to the signal line Si (i is one of 1 to x) to which an image signal is supplied, and a second terminal of the switching transistor 106 is connected to a gate electrode of the driving transistor 108. A first terminal of the driving transistor 108 is connected to the power supply line Vi to which a first potential is supplied, and a second terminal of the driving transistor 108 is connected to a first terminal of the current controlling transistor 109. A second terminal of the current controlling transistor 109 is connected to a pixel electrode of the light emitting element 107. A second potential is supplied to a common electrode of the light emitting element 107. A gate electrode of the current controlling transistor 109 is connected to a node to which a potential of an EN signal is supplied.

FIG. 7 illustrates a case where a storage capacitor 120 is provided in the pixel 105. The storage capacitor 120 is connected to the gate electrode of the driving transistor 108 and holds the potential of the gate electrode of the driving transistor 108. Specifically, one of electrodes of the storage capacitor 120 is connected to the gate electrode of the driving transistor 108 and the other is connected to a node to which a fixed potential is supplied, e.g., the power supply line Vi.

Figure 8:
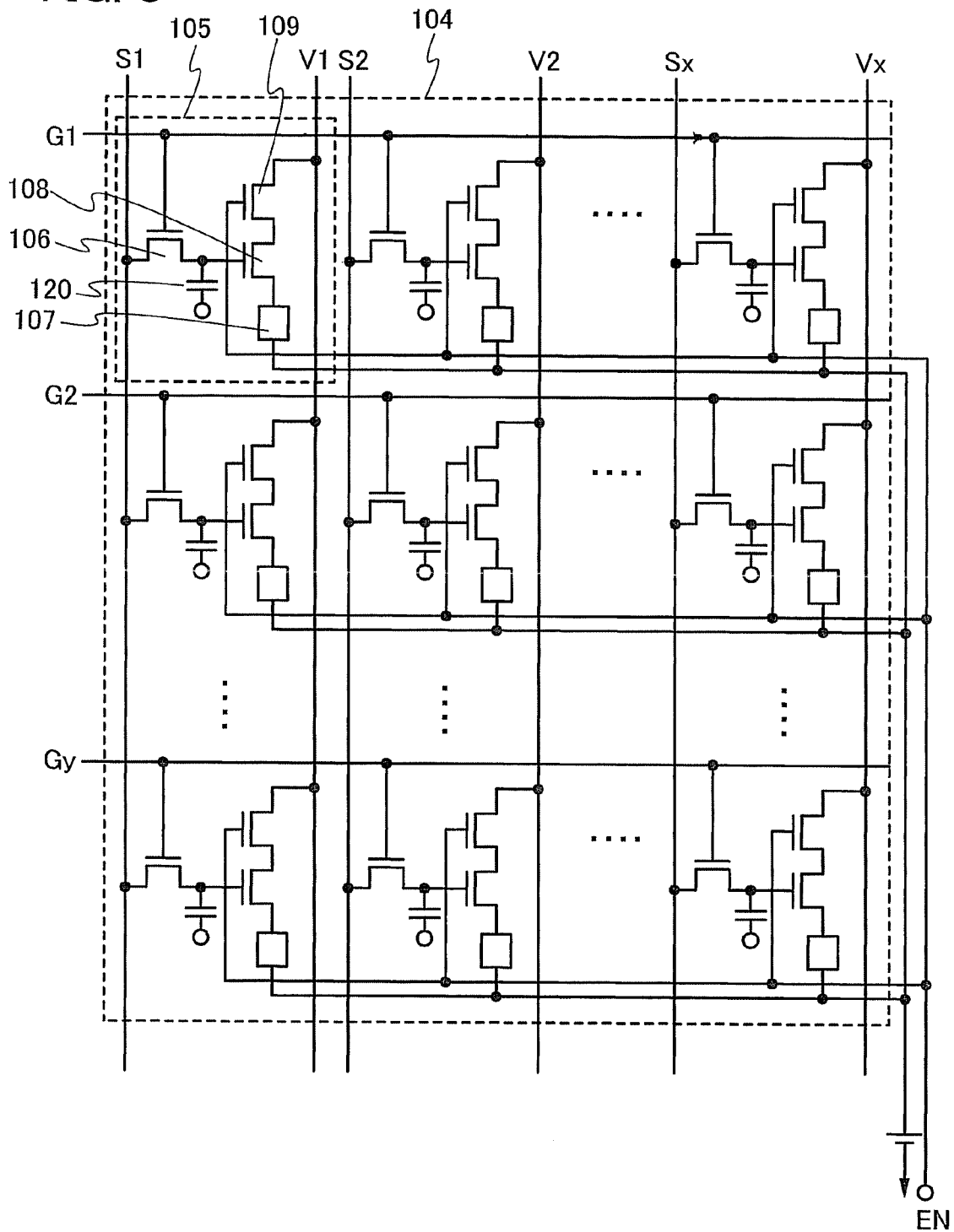
FIG. 8 illustrates one example of a specific circuit diagram of a pixel portion.

FIG. 8 illustrates another example of a specific circuit diagram of the pixel portion 104 including the plurality of pixels 105 shown in FIG. 1.

As shown in FIG. 8, the pixel portion 104 has signal lines S1 to Sx, scan lines G1 to Gy, and power supply lines V1 to Vx. The pixel 105 has one of the signal lines S1 to Sx, one of the scan lines G1 to Gy, and one of the power supply lines V1 to Vx.

In addition, in the pixel 105, a gate electrode of the switching transistor 106 is connected to the scan line Gj. A first terminal of the switching transistor 106 is connected to the signal line Si to which an image signal is supplied, and a second terminal of the switching transistor 106 is connected to a gate electrode of the driving transistor 108. A first terminal of the driving transistor 108 is connected to a second terminal of the current controlling transistor 109, and a second terminal of the driving transistor 108 is connected to a pixel electrode of the light emitting element 107. A second potential is supplied to a common electrode of the light emitting element 107. A first terminal of the current controlling transistor 109 is connected to the power supply line Vi to which a first potential is supplied. A gate electrode of the current controlling transistor 109 is connected to a node to which a potential of an EN signal is supplied.

FIG. 8 illustrates a case where a storage capacitor 120 is provided in the pixel 105. The storage capacitor 120 is connected to the gate electrode of the driving transistor 108 and holds the potential of the gate electrode of the driving transistor 108. Specifically, one of electrodes of the storage capacitor 120 is connected to the gate electrode of the driving transistor 108 and the other is connected to a node to which a fixed potential is supplied, e.g., the power supply line Vi.

Although FIGS. 7 and 8 illustrate cases where the switching transistor 106, the driving transistor 108, and the current controlling transistor 109 are n-channel transistors, any of these transistors is either one of an n-channel transistor and a p-channel transistor.

Next, a driving method of the pixel portion 104 shown in FIG. 7 or 8 is described below.

First, in a writing period, the scan lines G1 to Gy are sequentially selected. For example, the scan line Gj is selected and the switching transistor 106 whose gate electrode is connected to the scan line Gj is turned off. Then, the potential of the image signal input to the signal lines S1 to Sx is supplied to the gate electrode of the driving transistor 108 through the switching transistor 106 which is on. Then, the selection of the scan line Gj is competed to turn off the switching transistor 106, so that the potential of the image signal is held in the gate electrode of the driving transistor 108.

In the writing period, the current controlling transistor 109 is turned off in accordance with the potential of the EN signal, and thus the light emitting element 107 is off regardless of the level of the potential of the image signal.

Next, a display period is started after the writing period, the current controlling transistors 109 in all of the pixels 105 are turned on in accordance with the potential of the EN signal. Then, in the case where the driving transistor 108 is on in accordance with the potential of the image signal, current is supplied to the light emitting element 107 through the current controlling transistor 109, so that the light emitting element 107 emits light. The amount of current supplied to the light emitting element 107 is largely determined by the drain current of the driving transistor 108. Therefore, the luminance of the light emitting element 107 is determined in accordance with the potential of the image signal. On the other hand, in the case where the driving transistor 108 is off in accordance with the potential of the image signal, current is not supplied to the light emitting element 107, so that the light emitting element 107 emits no light.

Through the above operation, an image can be displayed.

This embodiment can be implemented as appropriate in combination with the embodiment described above.

Embodiment 3

Figure 9:
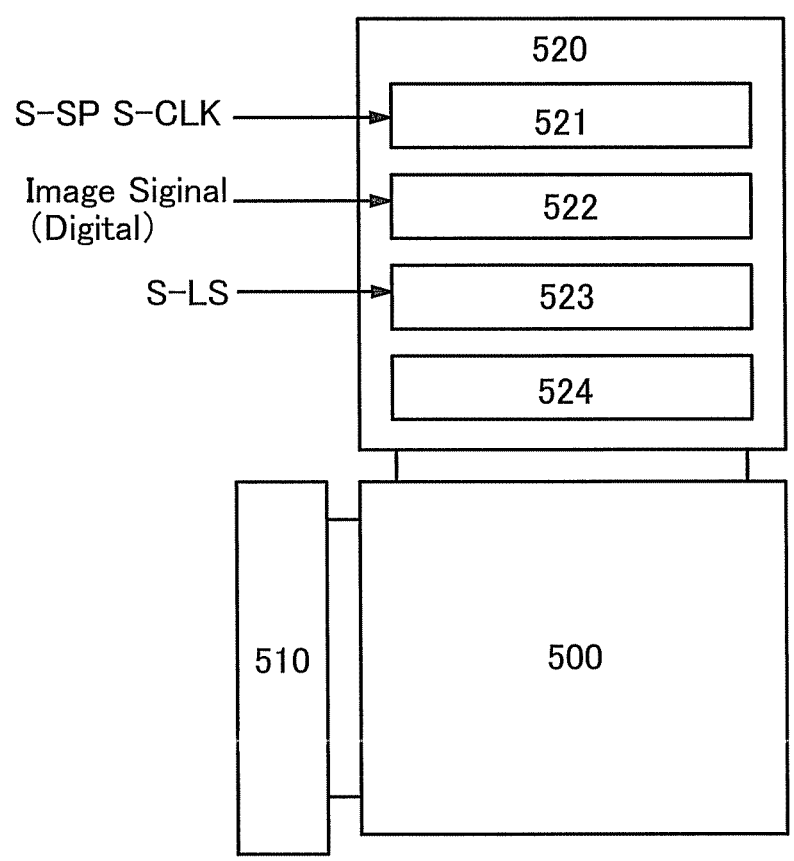
FIG. 9 is a block diagram of an image display portion.

In this embodiment, one example of a specific structure of an image display portion included in a display device according to one embodiment of the present invention will be described. In FIG. 9, a block diagram of an image display portion of this embodiment is shown as one example. Although circuits in the image display portion are classified in accordance with their functions and illustrated individually in the block diagram in FIG. 9, it is difficult to classify actual circuits in accordance with their functions completely and one circuit may have a plurality of functions.

The image display portion shown in FIG. 9 has a pixel portion 500 including a plurality of pixels, a scan line driver circuit 510 which selects pixels per line, and a signal line driver circuit 520 which controls an input of an image signal to the pixels in the selected line.

The signal line driver circuit 520 includes a shift register 521, a first memory circuit 522, a second memory circuit 523, and a DA convert 524. A clock signal S-CLK and a start pulse signal S-SP are input to the shift register 521. The shift register 521 generates a timing signal, the pulse of which is sequentially shifted, in accordance with the clock signal S-CLK and the start pulse signal S-SP, and outputs to the first memory circuit 522. The order of pulse generation of the timing signal may be switched in accordance with a signal for switching a scan direction.

A timing signal is input to the first memory circuit 522, and in accordance with the pulse of the timing signal, an image signal is sequentially written into the first memory circuit 522 and held. The image signal may be sequentially written into a plurality of memory circuits in the first memory circuit 522; or so-called division driving may be performed, in which the plurality of memory circuits in the first memory circuit 522 is divided into a plurality of groups and the image signal is input to the groups in parallel.

The time which is taken to perform one round of writing of the image signal into all the memory circuits in the first memory circuit 522 is called a line period. In practice, the line period may include a horizontal retrace period.

One line period is completed in this manner, and then, the image signals held in the first memory circuit 522 are written into the second memory circuit 523 all at once in accordance with a pulse of a latch signal S-LS and held. The next image signal is sequentially written into the first memory circuit 522 which has finished sending the image signal to the second memory circuit 523, in accordance with the timing signal from the shift register 521 again. During this second round of the one line period, the image signals written to and held in the second memory circuit 523 are input to the DA converter 524.

The DA converter 524 converts the input digital image signal into an analog image signal and inputs to the pixels in the pixel portion 500 through the signal lines.

The signal line driver circuit 520 may include another circuit which can output a signal whose pulse sequentially shifts, instead of the shift register 521.

Although the pixel portion 500 is directly connected to the lowest stage of the DA converter 524 in FIG. 9, one embodiment of the present invention is not limited to this structure. A circuit which performs signal processing on the image signal output from the DA converter 524 can be provided between the pixel portion 500 and the pixel portion 500. As examples of the circuit which performs signal processing, a buffer, a level shifter, and the like can be given.

Next, an operation of the scan line driver circuit 510 will be described. The scan line driver circuit 510 generates a selection signal whose pulse is sequentially shifted and which is input to the plurality of scan lines to select pixels per line. When a pixel is selected by the selection signal, the switching transistor, the gate of which is connected to one of the plurality of scan lines, is turned on, so that the image signal is input to the pixel.

Although the pixel portion 500, the scan line driver circuit 510, and the signal line driver circuit 520 can be provided over the same substrate, any of them may be provided over another substrate.

This embodiment can be implemented as appropriate in combination with any of the above-described embodiments.

Embodiment 4

Figure 10:
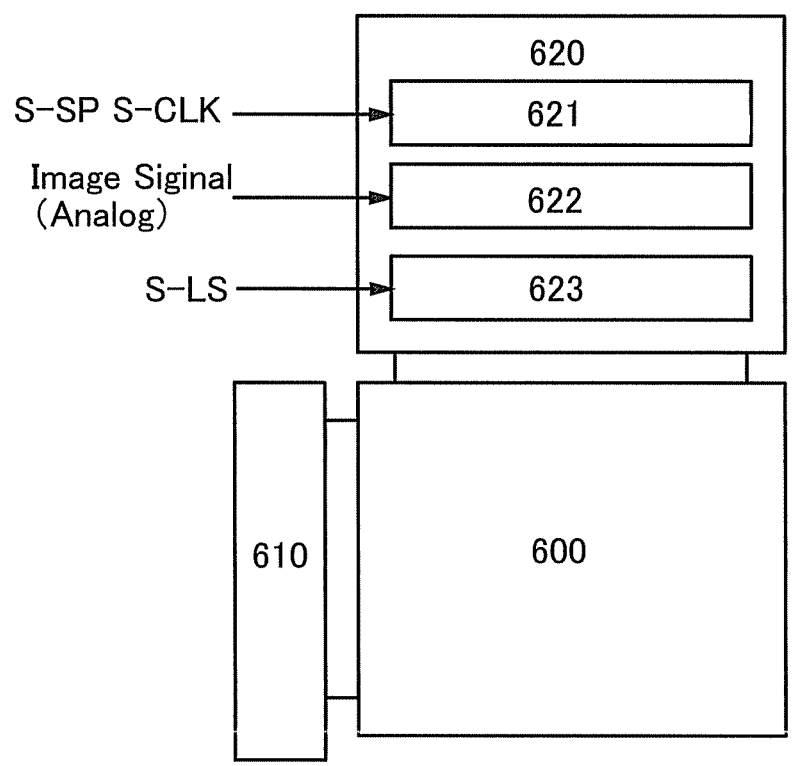
FIG. 10 is a block diagram of an image display portion.

In this embodiment, one example of a specific structure of an image display portion included in a display device according to one embodiment of the present invention will be described. In FIG. 10, a block diagram of an image display portion of this embodiment is shown as one example. Although circuits in the image display portion are classified in accordance with their functions and illustrated individually in the block diagram in FIG. 10, it is difficult to classify actual circuits in accordance with their functions completely and one circuit may have a plurality of functions.

The display device shown in FIG. 10 has a pixel portion 600 including a plurality of pixels, a scan line driver circuit 610 which selects pixels per line, and a signal line driver circuit 620 which controls an input of an image signal to the pixels in the selected line.

The signal line driver circuit 620 includes at least a shift register 621, a sampling circuit 622, and a memory circuit 623 which can store analog signals. A clock signal S-CLK and a start pulse signal S-SP are input to the shift register 621. The shift register 621 generates a timing signal whose pulse sequentially shifts in accordance with the clock signal S-CLK and the start pulse signal S-SP and inputs to the sampling circuit 622. The sampling circuit 622 samples analog image signals for one line period, which are input to the signal line driver circuit 620, in accordance with the input timing signals. The image signals for one line period are sampled in this manner, and then, the sampled image signals are output to the memory circuit 623 all at once in accordance with the latch signal S-LS and held. The image signals held in the memory circuit 623 are input to the pixel portion 600 through the signal lines.

Although an example in which the image signals for the one line period are sampled in the sampling circuit 622, and then, the sampled mage signals are input to the memory circuit 623 in the lower stage all at once is described in this embodiment, one embodiment of the present invention is not limited to this structure. In the sampling circuit 622, every time an image signal for each pixel is sampled, the sampled image signal may be input to the memory circuit 623 in the lower stage, without waiting for the one line period to finish.

In addition, image signals may be sampled per pixel sequentially, or pixels in one line may be provide into a plurality of groups and image signals may be sampled per group of pixels in parallel.

Although the pixel portion 600 is directly connected to the lowest stage of the memory circuit 623 in FIG. 10, one embodiment of the present invention is not limited to this structure. A circuit which performs signal processing on the analog image signal output from the memory circuit 623 can be provided between the memory circuit 623 and the pixel portion 600. As an example of the circuit which performs signal processing, a buffer which can shape the waveform can be given.

Then, in parallel to an input of the image signals from the memory circuit 623 to the pixel portion 600, the sampling circuit 622 can sample image signals for the next line period.

Next, an operation of the scan line driver circuit 610 will be described. The scan line driver circuit 610 generates a selection signal whose pulse is sequentially shifted and which is input to the plurality of scan lines to select pixels per line. When a pixel is selected by the selection signal, the switching transistor, the gate of which is connected to one of the plurality of scan lines, is turned on, so that the image signal is input to the pixel.

Although the pixel portion 600, the scan line driver circuit 610, and the signal line driver circuit 620 can be provided over the same substrate, any of them may be provided over another substrate.

This embodiment can be implemented as appropriate in combination with any of the above-described embodiments.

Embodiment 5

Described in this embodiment are cross-sectional structures of a transistor and a light emitting element in a display device according to one embodiment of the present invention. In this embodiment, a cross-sectional structure of a pixel where a transistor for driving a light emitting element is an n-channel transistor is described with reference to FIGS. 11A to 11C. Although the case where a pixel electrode is a cathode and a common electrode is an anode is illustrated in FIGS. 11A to 11C, a pixel electrode may be an anode and a common electrode may be a cathode.

Figure 11A:
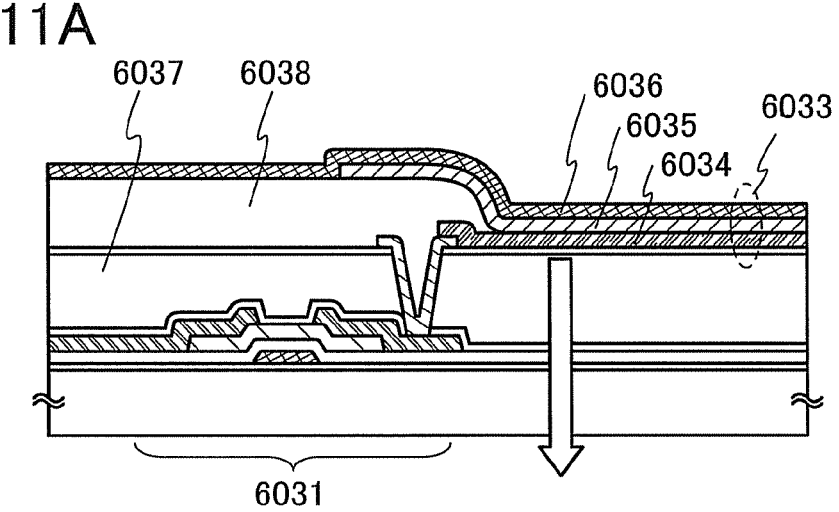
FIGS. 11A to 11C illustrate cross-sectional structures of pixels.
Figure 11B:
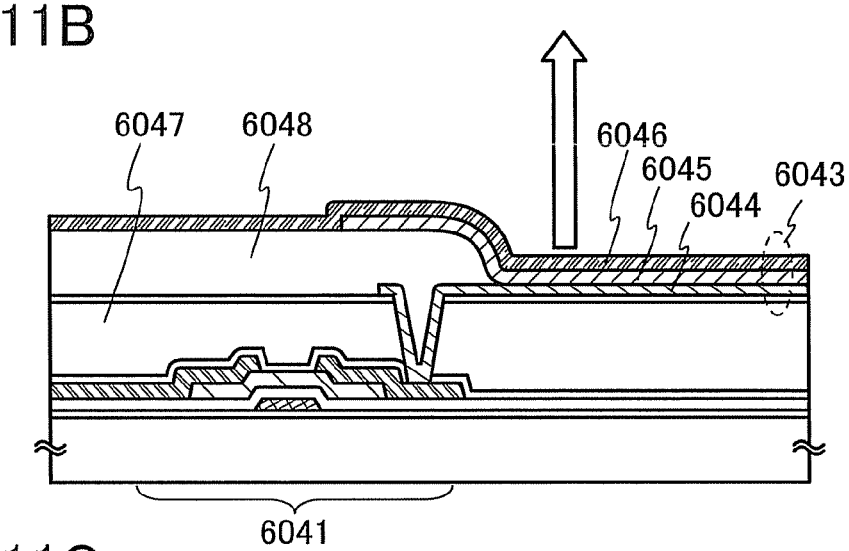
Figure 11C:
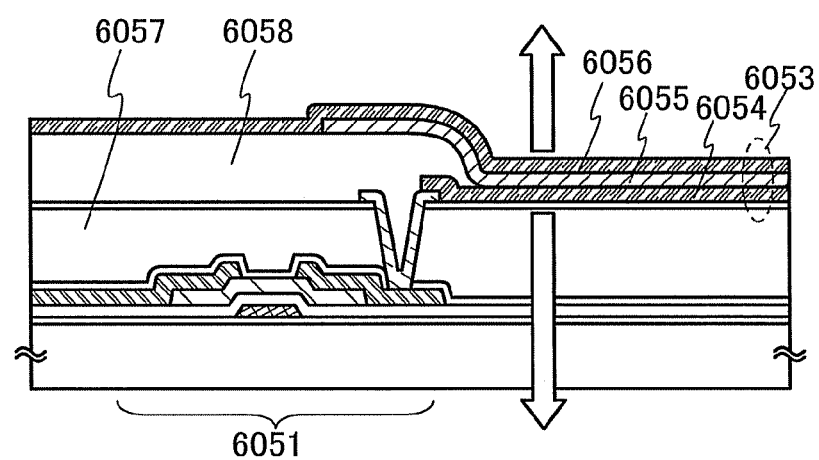

FIG. 11A shows a cross-sectional view of a pixel in the case where an n-channel transistor is employed as a driving transistor 6031, and light emitted from a light emitting element 6033 is extracted from the pixel electrode 6034 side. The transistor 6031 is covered with an insulating film 6037, and over the insulating film 6037, a bank 6038 having an opening is formed. In the opening of the bank 6038, the pixel electrode 6034 is partly exposed, and the pixel electrode 6034, an electroluminescence layer 6035, and a common electrode 6036 are sequentially stacked in the opening.

The pixel electrode 6034 is formed of a material or to a thickness which transmits light, and can be formed using a material having a low work function of a metal, an alloy, an electrically conductive compound, a mixture thereof, or the like. Specifically, an alkaline metal such as Li or Cs, an alkaline earth metal such as Mg, Ca, or Sr, an alloy containing such a metal (e.g., Mg:Ag, Al:Li, or Mg:In), a compound of such a material (e.g., calcium fluoride or calcium nitride), or a rare-earth metal such as Yb or Er can be used. Further, in the case where an electron injection layer is provided, another conductive layer such as an aluminum layer may be used; then, the pixel electrode 6034 is formed to a thickness to transmit light (preferably, about 5 nm to 30 nm); and furthermore, a light-transmitting conductive film of a light-transmitting oxide conductive material may be formed so as to be in contact with and over or under the above-described conductive film as thin as light can be transmitted therethrough to suppress the sheet resistance of the first electrode 6034. Alternatively, the first electrode 6034 may be formed using only a conductive film of another light-transmitting oxide conductive material such as indium tin oxide (ITO), zinc oxide (ZnO), indium zinc oxide (IZO), or gallium-doped zinc oxide (GZO). A mixture in which zinc oxide (ZnO) is mixed at 2% to 20% in indium tin oxide including ITO and silicon oxide (hereinafter referred to as ITSO) or in indium oxide including silicon oxide may be used as well. Graphene or the like may be used for the pixel electrode 6034. In the case of using the light-transmitting oxide conductive material, it is preferable to provide an electron injection layer in the electroluminescence layer 6035.

The common electrode 6036 is formed using a material and to a thickness such that light is reflected or blocked, and can be formed using a material suitable for being used as an anode. For example, a single-layer film including one or more of titanium nitride, zirconium nitride, titanium, tungsten, nickel, platinum, chromium, silver, aluminum, and the like, a stacked layer of a titanium nitride film and a film including aluminum as a main component, a three-layer structure of a titanium nitride film, a film including aluminum as a main component, and a titanium nitride film, or the like can be used for the common electrode 6036.

The electroluminescence layer 6035 is formed using a single layer or a plurality of layers. In the case of a plurality of layers, these layers can be classified into a hole injection layer, a hole transport layer, a light emitting layer, an electron transport layer, an electron injection layer, and the like in view of the carrier transport property. In the case where the electroluminescence layer 6035 includes every or any of a hole injection layer, a hole transport layer, an electron transport layer, and an electron injection layer in addition to a light emitting layer, the stack order from the pixel electrode 6034 side is as follows: the electron injection layer, the electron transport layer, the light emitting layer, the hole transport layer, and the hole injection layer. The boundary between the layers is not necessarily clear, and there may be a case where the boundary is unclear since materials for forming the layers are partly mixed. Each layer may be formed using an organic material or an inorganic material. As the organic material, any of a high molecular material, a medium molecular material, and a low molecular material may be used. The medium molecular material corresponds to a low polymer in which the number of repetitions of a structural unit (the degree of polymerization) is about 2 to 20. A distinction between the hole injection layer and the hole transport layer is not necessarily distinct, and they are the same as each other in the sense that a hole transport property (hole mobility) is an especially important characteristic. A layer being in contact with the anode is referred to as a hole injection layer and a layer being in contact with the hole injection layer is referred to as a hole transport layer for convenience. The same is also true for the electron transport layer and the electron injection layer; a layer being in contact with the cathode is referred to as an electron injection layer and a layer being in contact with the electron injection layer is referred to as an electron transport layer. In some cases, the light emitting layer also functions as the electron transport layer, and it is therefore referred to as a light emitting electron transport layer, too.

In the pixel shown in FIG. 11, light emitted from the light emitting element 6033 can be extracted from the pixel electrode 6034 side as indicated by a hollow arrow.

Next, a cross-sectional view of a pixel in the case where a transistor 6041 is an n-channel transistor, and light emitted from a light emitting element 6043 is extracted from the common electrode 6046 side is shown in FIG. 11B. The transistor 6041 is covered with an insulating film 6047, and over the insulating film 6047, a bank 6048 having an opening is formed. In the opening of the bank 6048, a pixel electrode 6044 is partially exposed, and the pixel electrode 6044, an electroluminescence layer 6045, and the common electrode 6046 are sequentially stacked in the opening.

The pixel electrode 6044 is formed of a material and to a thickness to reflect or shield light, and can be formed of a material having a low work function of a metal, an alloy, an electrically conductive compound, a mixture thereof, or the like. Specifically, an alkaline metal such as Li or Cs, an alkaline earth metal such as Mg, Ca, or Sr, an alloy containing such a metal (e.g., Mg:Ag, Al:Li, or Mg:In), a compound of such a material (e.g., calcium fluoride or calcium nitride), or a rare-earth metal such as Yb or Er can be used. Further, in the case where an electron injection layer is provided, another conductive film of aluminum or the like may be used.

The common electrode 6046 is formed of a material or to a thickness to transmit light, and formed of a material suitable for being used as an anode. For example, another light-transmitting oxide conductive material such as indium tin oxide (ITO), zinc oxide (ZnO), indium zinc oxide (IZO), or gallium-doped zinc oxide (GZO) can be used for the common electrode 6046. Alternatively, the common electrode 6046 may be formed using indium tin oxide containing silicon oxide (hereinafter referred to as ITSO), or a mixture of indium oxide containing silicon oxide and 2% to 20% of zinc oxide (ZnO). Graphene or the like may be used for the common electrode 6046. Further, as well as the above-described light-transmitting oxide conductive material, a single-layer film including one or more of titanium nitride, zirconium nitride, titanium, tungsten, nickel, platinum, chromium, silver, aluminum, and the like, a stacked layer of a titanium nitride film and a film including aluminum as a main component, a three-layer structure of a titanium nitride film, a film including aluminum as a main component, and a titanium nitride film, or the like can be used for the common electrode 6046. In the case of using any material other than the light-transmitting oxide conductive material, the common electrode 6046 is formed to a thickness with which light can be transmitted therethrough (preferably about 5 nm to 30 nm).

The electroluminescence layer 6045 can be formed in a similar manner to the electroluminescence layer 6035 of FIG. 11A.

In the case of the pixel shown in FIG. 11B, light emitted from the light emitting element 6043 can be extracted from the common electrode 6046 side as indicated by a hollow arrow.

Next, a cross-sectional view of a pixel in the case where a transistor 6051 is an n-channel transistor, and light emitted from a light emitting element 6053 is extracted from the pixel electrode 6054 side and the common electrode 6056 side is shown in FIG. 11C. The transistor 6051 is covered with an insulating film 6057, and over the insulating film 6057, a bank 6058 having an opening is formed. In the opening of bank 6058, the pixel electrode 6054 is partly exposed, and the pixel electrode 6054, an electroluminescence layer 6055, and the common electrode 6056 are sequentially stacked in the opening.

The pixel electrode 6054 can be formed in a manner similar to that of the pixel electrode 6034 in FIG. 11A. The common electrode 6056 can be formed in a manner similar to that of the common electrode 6046 of FIG. 11B. The electroluminescence layer 6055 can be formed in a similar manner to the electroluminescence layer 6035 of FIG. 11A.

In the case of the pixel shown in FIG. 11C, light emitted from the light emitting element 6053 can be extracted from both sides of the pixel electrode 6054 side and the common electrode 6056 side as indicated by hollow arrows.

This embodiment can be implemented as appropriate in combination with any of the above-described embodiments.

Embodiment 6

In this embodiment, a structure of a transistor using an oxide semiconductor film will be described.

Figure 12A:
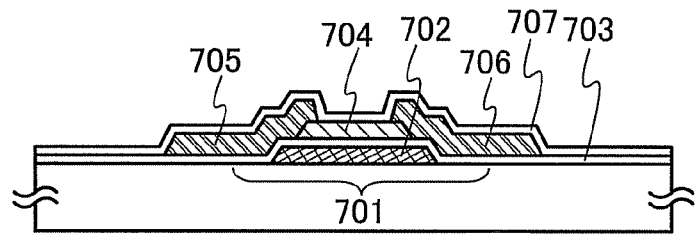
FIGS. 12A to 12E illustrate cross-sectional structures of transistors.

A transistor 701 shown in FIG. 12A has a bottom gate structure with a channel-etched type.

The transistor 701 includes a gate electrode 702 formed over an insulating surface, a gate insulating film 703 over the gate electrode 702, an oxide semiconductor film 704 which is over the gate insulating film 703 and overlaps with the gate electrode 702, and a conductive film 705 and a conductive film 706 formed over the oxide semiconductor film 704. The transistor 701 may further include an insulating film 707 formed over the oxide semiconductor film 704 and the conductive film 705 and the conductive film 706.

The transistor 701 shown in FIG. 12A may further include a back-gate electrode formed over the insulating film 707 in a portion which overlaps with the oxide semiconductor film 704.

Figure 12B:
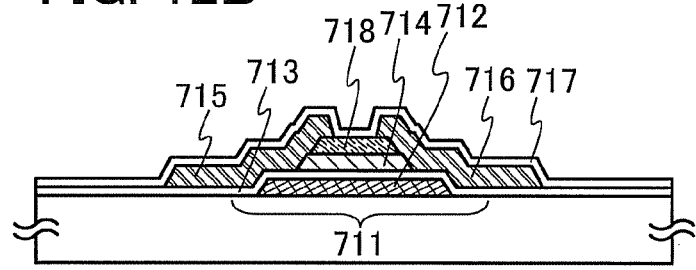

A transistor 711 shown in FIG. 12B has a bottom gate structure with a channel-protective type.

The transistor 711 includes a gate electrode 712 formed over an insulating surface, a gate insulating film 713 over the gate electrode 712, an oxide semiconductor film 714 which is over the gate insulating film 713 and overlaps with the gate electrode 712, a channel protective film 718 formed over the oxide semiconductor film 714, and a conductive film 715 and a conductive film 716 formed over the oxide semiconductor film 714. The transistor 711 may further include an insulating film 717 formed over the channel protective film 718, the conductive film 715, and the conductive film 716.

The transistor 711 shown in FIG. 12B may further include a back-gate electrode formed over the insulating film 717 in a portion which overlaps with the oxide semiconductor film 714.

The channel protective film 718 can prevent the portion of the oxide semiconductor film 714, which serves as a channel formation region, from being damaged in a later step (for example, reduction in thickness due to plasma or an etchant in etching). Consequently, reliability of the transistor 711 can be improved.

Figure 12C:
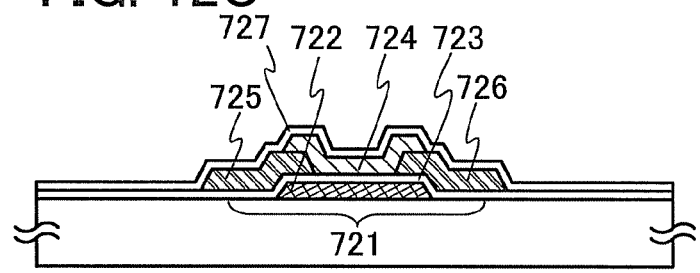

A transistor 721 shown in FIG. 12C has a bottom gate structure with a bottom-contact type.

The transistor 721 includes a gate electrode 722 foamed over an insulating surface, a gate insulating film 723 over the gate electrode 722, a conductive film 725 and a conductive film 726 over the gate insulating film 723, and an oxide semiconductor film 724 which is over the gate insulating film 723 and which overlaps with the gate electrode 722 and which is formed over the conductive film 725 and the conductive film 726. The transistor 721 may further include an insulating film 727 formed over the conductive film 725, the conductive film 726, and the oxide semiconductor film 724.

The transistor 721 shown in FIG. 12C may further include a back-gate electrode formed over the insulating film 727 in a portion which overlaps with the oxide semiconductor film 724.

Figure 12D:
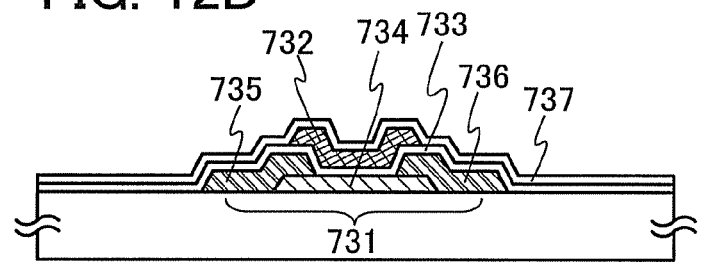

A transistor 731 shown in FIG. 12D has a top gate structure with a top-contact type.

The transistor 731 includes an oxide semiconductor film 734 formed over an insulating surface, a conductive film 735 and a conductive film 736 over the oxide semiconductor film 734, a gate insulating film 733 formed over the oxide semiconductor film 734, the conductive film 735, and the conductive film 736, and a gate electrode 732 which is over the gate insulating film 733 and which overlaps with the oxide semiconductor film 734. The transistor 731 may further include an insulating film 737 formed over the gate electrode 732.

Figure 12E:
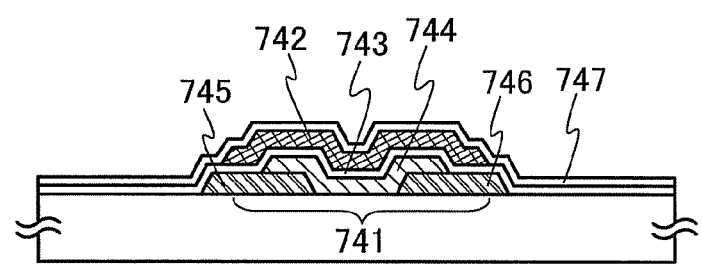

A transistor 741 shown in FIG. 12E has a top gate structure with a bottom-contact type.

The transistor 741 includes a conductive film 745 and a conductive film 746 formed over an insulating surface, a oxide semiconductor film 744 formed over the conductive film 745 and the conductive film 746, a gate insulating film 743 formed over the oxide semiconductor film 744, the conductive film 745, and the conductive film 746, and a gate electrode 742 which is over the gate insulating film 743 and which overlaps with the oxide semiconductor film 744. The transistor 741 may further include an insulating film 747 formed over the gate electrode 742.

In FIGS. 12A to 12E, any conductive film of the conductive films 705 and 706, the conductive films 715 and 716, the conductive films 725 and 726, the conductive films 735 and 736, and the conductive films 745 and 746 can be formed using an element selected form aluminum, chromium, copper, tantalum, titanium, molybdenum, and tungsten, an alloy containing the above element as a main component, or an alloy film using a combination of the above-described elements. A film of a refractory metal such as chromium, tantalum, titanium, molybdenum, or tungsten may be stacked over or below a metal film of aluminum, copper, or the like. Aluminum or copper is preferably combined with a refractory metal material so as to avoid a heat resistance problem and a corrosive problem. As the refractory metal material, molybdenum, titanium, chromium, tantalum, tungsten, neodymium, scandium, yttrium, or the like can be used.

An oxide semiconductor film formed by sputtering or the like contains a large amount of moisture or hydrogen (including a hydroxyl group) as an impurity in some cases. Moisture or hydrogen easily forms a donor level and thus serves as an impurity in the oxide semiconductor. Thus, it is preferable that in order to reduce the impurities such as moisture and hydrogen in the oxide semiconductor film 704, 714, 724, 734, and 744 (hereinafter simply referred to as the oxide semiconductor film) in FIGS. 12A to 12E (in order to perform dehydration or dehydrogenation), the oxide semiconductor film be subjected to heat treatment in a reduced-pressure atmosphere, an inert gas atmosphere of nitrogen, a rare gas, or the like, an oxygen gas atmosphere, or an ultra-dry air atmosphere (the moisture amount is 20 ppm (−55° C. by conversion into a dew point) or less, preferably 1 ppm or less, further preferably 10 ppb or less according to the measurement by a dew point meter in a cavity ring down laser spectroscopy (CRDS) method).

With the heat treatment on the oxide semiconductor film, moisture or hydrogen in the oxide semiconductor film can be eliminated. Specifically, heat treatment may be performed at a temperature higher than or equal to 250° C. and lower than or equal to 750° C., preferably higher than or equal to 400° C. and lower than the strain point of a substrate. For example, heat treatment may be performed at 500° C. for a period longer than or equal to about 3 minutes and shorter than or equal to 6 minutes. For the heat treatment, an RTA method enables dehydration or dehydrogenation to be performed in a short period of time; therefore, the treatment can be performed even at a temperature higher than the strain point of a glass substrate.

The heat treatment apparatus is not limited to an electric furnace, and may have a device for heating an object by heat conduction or heat radiation from a heating element such as a resistance heating element. For example, an RTA (rapid thermal anneal) apparatus such as a GRTA (gas rapid thermal anneal) apparatus or an LRTA (lamp rapid thermal anneal)

apparatus can be used. The LRTA apparatus is an apparatus for heating an object by radiation of light (an electromagnetic wave) emitted from a lamp such as a halogen lamp, a metal halide lamp, a xenon arc lamp, a carbon arc lamp, a high pressure sodium lamp, or a high pressure mercury lamp. The GRTA apparatus is an apparatus for heat treatment using a high-temperature gas. As the gas, an inert gas which does not react with an object by heat treatment, like nitrogen or a rare gas such as argon is used.

In the heat treatment, it is preferable that moisture, hydrogen, and the like be not contained in nitrogen or the rare gas such as helium, neon, or argon. Alternatively, the purity of nitrogen or the rare gas such as helium, neon, or argon which is introduced into the heat treatment apparatus is preferably greater than or equal to 6 N (99.9999%), further preferably greater than or equal to 7 N (99.99999%) (i.e., the impurity concentration is preferably less than or equal to 1 ppm, further preferably less than or equal to 0.1 ppm).

Note that it has been pointed out that an oxide semiconductor is insensitive to impurities, there is no problem when a considerable amount of metal impurities is contained in the film, and therefore, soda-lime glass which contains a large amount of alkali metal such as sodium and is inexpensive can also be used (Kamiya, Nomura, and Hosono, "Carrier Transport Properties and Electronic Structures of Amorphous Oxide Semiconductors: The present status", *KOTAI BUTSURI (SOLID STATE PHYSICS)*, 2009, Vol. 44, pp. 621-633). Such consideration is not appropriate. Alkali metal is not a constituent element of an oxide semiconductor, and thus is an impurity. Alkaline earth metal is also impurity in the case where alkaline earth metal is not a constituent element of an oxide semiconductor. Among alkali metals, in particular, Na becomes Na$^+$ when an insulating film in contact with the oxide semiconductor film is an oxide and Na diffuses into the insulating layer. In addition, in the oxide semiconductor film, Na cuts or enters a bond between metal and oxygen which are constituent elements of an oxide semiconductor. As a result, for example, deterioration of characteristics of the transistor, such as change to a normally-on state of the transistor due to shift of a threshold voltage in the negative direction, or reduction in mobility, occurs. In addition, variation in characteristics occurs. Such deterioration of characteristics of the transistor and variation in characteristics due to the impurity remarkably appear when the hydrogen concentration in the oxide semiconductor film is very low. Therefore, in the case where the hydrogen concentration in the oxide semiconductor film is equal to or less than $5\times10^{19}$ cm$^{-3}$, particularly equal to or less than $5\times10^{18}$ cm$^{-3}$, it is preferable to reduce the concentration of the above impurity as much as possible. Specifically, it is preferable that the measurement value of a Na concentration by secondary ion mass spectrometry be less than or equal to $5\times10^{16}$/cm$^3$, further preferably less than or equal to $1\times10^{16}$/cm$^3$, still further preferably less than or equal to $1\times10^{15}$/cm$^3$. In a similar manner, it is preferable that the measurement value of a Li concentration be less than or equal to $5\times10^{15}$/cm$^3$, further preferably less than or equal to $1\times10^{15}$/cm$^3$. In a similar manner, it is preferable that the measurement value of a K concentration be less than or equal to $5\times10^{15}$/cm$^3$, further preferably less than or equal to $1\times10^{15}$/cm$^3$.

Reduction in the hydrogen concentration in an oxide semiconductor film leads to stabilization of the oxide semiconductor film. In addition, heat treatment at a temperature lower than or equal to the glass transition temperature makes it possible to form an oxide semiconductor film with a wide bandgap in which the density of carriers generated due to a hydrogen defect is low. Therefore, the transistor can be manufactured using a large-sized substrate, thereby increasing the productivity. That heat treatment can be performed any time after the oxide semiconductor film is deposited.

The insulating film in contact with the oxide semiconductor film, such as the gate insulating film 703, the insulating film 707, the gate insulating film 713, the gate insulating film 723, the insulating film 727, the gate insulating film 733, or the gate insulating film 743 can be formed using an inorganic material containing oxygen (e.g., silicon oxide, silicon nitride oxide, silicon oxynitride, aluminum oxide, or aluminum oxynitride). By using the inorganic material containing oxygen for the insulating film, even when oxygen deficiency is generated in the oxide semiconductor film owing to heat treatment for reducing moisture or hydrogen, oxygen can be supplied from the oxide semiconductor film to the insulating film to reduce the oxygen deficiency which serves as a donor, so that a structure which satisfies the stoichiometric composition ratio can be obtained. Accordingly, the channel formation region can be made to be close to an i-type and variation in electrical characteristics due to the oxygen deficiency of the transistors 701, 711, 721, 731, and 741 can be reduced, which results in improvement of the electrical characteristics.

The insulating film in contact with the oxide semiconductor film, such as the gate insulating film 703, the insulating film 707, the gate insulating film 713, the gate insulating film 723, the insulating film 727, the gate insulating film 733, or the gate insulating film 743 can also be formed using an inorganic material containing oxygen and a Group 13 element of the periodic table. Since many oxide semiconductors contain a Group 13 element of the periodic table, the Group 13 element fits the oxide semiconductor well. Therefore, by using such an insulating material for the insulating film in contact with the oxide semiconductor film, the state of an interface with the oxide semiconductor film can be kept well.

An insulating material containing a Group 13 element refers to an insulating material including one or more Group 13 elements of the periodic table. As the insulating material containing a Group 13 element, gallium oxide, aluminum oxide, aluminum gallium oxide, a gallium aluminum oxide, and the like are given. Here, aluminum gallium oxide refers to a material in which the amount of aluminum is larger than that of gallium in atomic percent, and gallium aluminum oxide refers to a material in which the amount of gallium is larger than or equal to that of aluminum in atomic percent.

For example, in the case of forming an insulating film in contact with an oxide semiconductor film containing gallium, a material containing gallium oxide may be used for the insulating film, so that the interface characteristics between the oxide semiconductor film and the insulating film can be kept well. For example, with the structure in which the oxide semiconductor film is in contact with the insulating film containing gallium oxide, pileup of hydrogen in the interface between the oxide semiconductor film and the insulating film can be suppressed. The similar effect as the above can be obtained in the case where an element in the same group as a constituent element of the oxide semiconductor is used in the insulating film. For example, it is effective to the insulating film with the use of a material containing aluminum oxide. Since aluminum oxide is less water-permeable, it is preferable to use the material containing aluminum oxide also in terms of prevention of entry of water to the oxide semiconductor film.

This embodiment can be implemented as appropriate in combination with any of the above-described embodiments.

Example 1

According to one embodiment of the present invention, a three-dimensional-image display device capable of displaying an image with a high brightness with low power consumption while suppressing occurrence of crosstalk can be provided. Therefore, with an electronic device using the above-described display device, whose power consumption is low, clear three-dimensional images can be displayed.

Figure 13A:
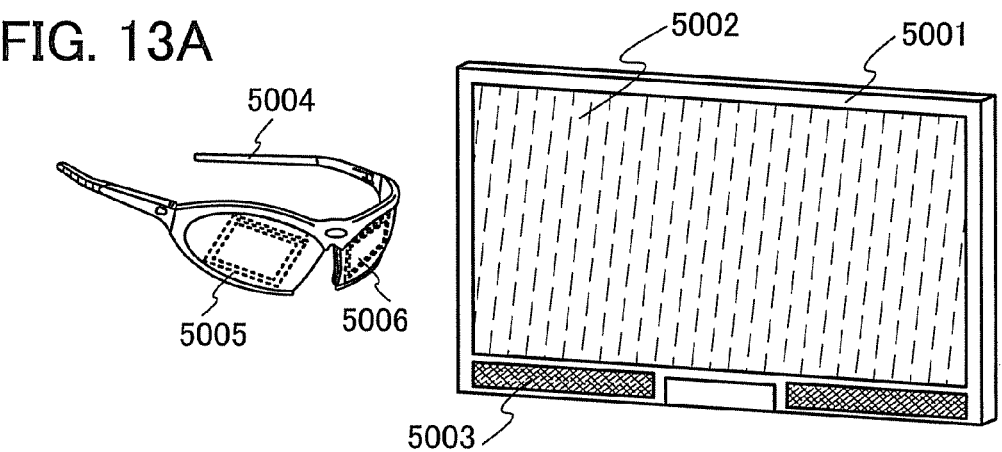
FIGS. 13A to 13C illustrate electronic devices.
Figure 13B:
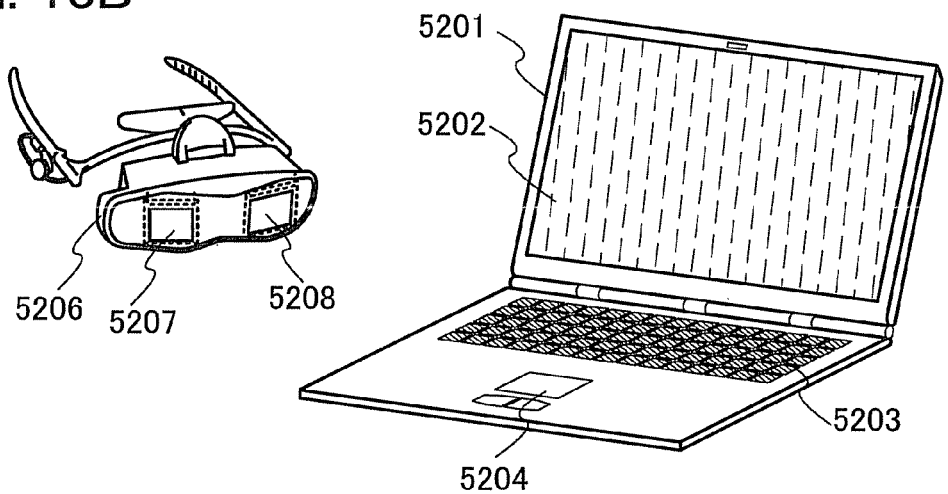
Figure 13C:
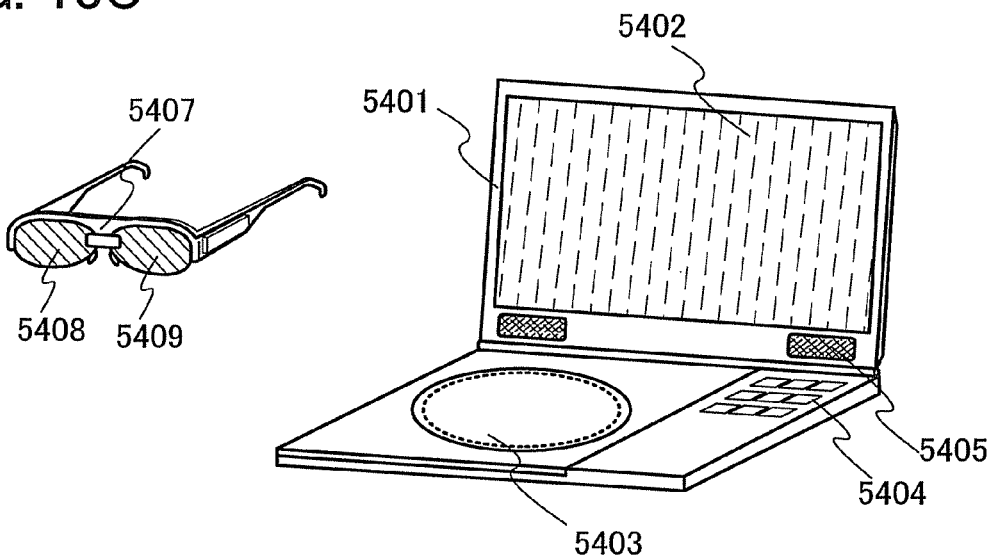

Specifically, the display device according to one embodiment of the present invention can be applied to image display devices, laptop computers, or image reproducing devices provided with recording media (typically devices which reproduce the content of recording media such as DVDs (digital versatile disc) and have displays for displaying the reproduced images). Further, mobile phones, portable game machines, personal digital assistances, e-book readers, and the like can be given. FIGS. 13A to 13C illustrate specific examples of these electronic devices.

FIG. 13A illustrates an image display device including a housing for an image display portion 5001, an image display portion 5002 corresponding to the image display portion, a speaker portion 5003, a goggle 5004 corresponding to a light-shielding portion, and the like. The goggle 5004 includes a shutter for the right eye 5005 and a shutter for the left eye 5006. A control portion for controlling the transmittances of the shutter for the right eye 5005 and the shutter for the left eye 5006 in synchronization with display of an image for the right eye or an image for the let eye on the display portion 5002 may be provided for the goggle 5004 or inside the housing for an image display portion 5001. With the use of the display device according to one embodiment of the present invention for the image display device, an image display device capable of displaying clear three-dimensional images with low power consumption can be provided.

Examples of the image display device include any image display device for displaying data for personal computers, TV broadcasting receiver, advertisement, and the like.

FIG. 13B illustrates a laptop computer including a housing for an image display portion 5201, a display portion 5202 corresponding to the image display portion, a keyboard 5203, a pointing device 5204, a goggle 5206 corresponding to a light-shielding portion, and the like. The goggle 5206 includes a shutter for the right eye 5207 and a shutter for the left eye 5208. A control portion for controlling the transmittances of the shutter for the right eye 5207 and the shutter for the left eye 5208 in synchronization with display of an image for the right eye or an image for the let eye on the display portion 5202 may be provided for the goggle 5206 or inside the housing for an image display portion 5201. With the use of the display device according to one embodiment of the present invention for the laptop computer, a laptop computer capable of displaying clear three-dimensional images with low power consumption can be provided.

FIG. 13C illustrates a mobile image reproducing device having memory medium (such as a DVD reproducing device) including a housing for an image display portion 5401, a display portion 5402 corresponding to the image display portion, a memory medium (such as DVD) reading portion 5403, an operation key 5404, a speaker portion 5405, a goggle 5407 corresponding to a light-shielding portion, and the like. The goggle 5407 includes a shutter for the right eye 5408 and a shutter for the left eye 5409. The image reproducing device having memory medium includes in its category a home game machine and the like. A control portion for controlling the transmittances of the shutter for the right eye 5408 and the shutter for the left eye 5409 in synchronization with display of an image for the right eye or an image for the let eye on the display portion 5402 may be provided for the goggle 5407 or inside the housing for an image display portion 5401. With the use of the display device according to one embodiment of the present invention for the image reproducing device, an image reproducing device capable of displaying clear three-dimensional images with low power consumption can be provided.

As described above, the present invention can be widely applied to and used for electronic devices in a wide variety of fields.

This example can be implemented as appropriate in combination with any of the above-described embodiments.

This application is based on Japanese Patent Application serial no. 2010-202729 filed with Japan Patent Office on Sep. 10, 2010, the entire contents of which are hereby incorporated by reference.

What is claimed is:

1. A display device comprising:
a pixel portion comprising a plurality of pixels including a first line pixel and a second line pixel;
a light-shielding portion including a first shutter and a second shutter; and
a control portion configured to control a transmittance of the first shutter and a transmittance of the second shutter in synchronization with a display of an image for a right eye and a display of an image for a left eye in the pixel portion,
wherein each of the plurality of pixels includes a switching transistor configured to control an input of an image signal to one of the pixels, a light emitting element, a driving transistor configured to control a value of a current supplied to the light emitting element in accordance with the image signal, and a current controlling transistor configured to control the current supplied to the light emitting element,
wherein each of the first line pixel and the second line pixel includes a group of pixels whose gate electrodes of the switching transistors are connected to each other, and
wherein all of the gate electrodes of the current controlling transistors of the first line pixel and the second line pixel are directly connected to each other.

2. The display device according to claim 1,
wherein the first shutter and the second shutter comprise at least one liquid crystal element.

3. The display device according to claim 1,
wherein at least one of the switching transistor, the driving transistor, and the current controlling transistor includes an active layer including an oxide semiconductor.

4. The display device according to claim 3,
wherein the oxide semiconductor is an In—Ga—Zn—O-based oxide semiconductor.

5. The display device according to claim 3,
wherein a hydrogen concentration of the active layer is equal to or less than $5 \times 10^{19}/cm^3$.

6. A display device comprising:
a pixel portion comprising a plurality of pixels including a first line pixel and a second line pixel;
a light-shielding portion including a first shutter and a second shutter; and
a control portion configured to control a transmittance of the first shutter and a transmittance of the second shutter in synchronization with a display of an image for a right eye and a display of an image for a left eye in the pixel portion,
wherein each of the plurality of pixels includes a switching transistor, a driving transistor, a current controlling transistor, and a light emitting element, wherein an image signal is supplied to a first terminal of the switching transistor, and a gate electrode of the driving transistor is connected to a second terminal of the switching transistor, wherein a first potential is supplied to a first terminal of the driving transistor, and a second terminal of the driving transistor is connected to a first terminal of the current controlling transistor, wherein a second terminal of the current controlling transistor is connected to a pixel electrode of the light emitting element, and a second potential which is different from the first potential is supplied to a common electrode of the light emitting element, wherein each of the first line pixel and the second line pixel includes a group of pixels whose gate electrodes of the switching transistors are connected to each other, and wherein all of the gate electrodes of the current controlling transistors of the first line pixel and the second line pixel are directly connected to each other.

7. The display device according to claim 6,
wherein the first shutter and the second shutter comprise at least one liquid crystal element.

8. The display device according to claim 6,
wherein at least one of the switching transistor, the driving transistor, and the current controlling transistor includes an active layer including an oxide semiconductor.

9. The display device according to claim 8,
wherein the oxide semiconductor is an In—Ga—Zn—O-based oxide semiconductor.

10. The display device according to claim 8,
wherein a hydrogen concentration of the active layer is equal to or less than $5 \times 1019/cm3$.

11. A display device comprising:
a pixel portion comprising a plurality of pixels including a first line pixel and a second line pixel;
a light-shielding portion including a first shutter and a second shutter; and
a control portion configured to control a transmittance of the first shutter and a transmittance of the second shutter in synchronization with a display of an image for a right eye and a display of an image for a left eye in the pixel portion, wherein each of the plurality of pixels includes a switching transistor, a driving transistor, a current controlling transistor, and a light emitting element, wherein an image signal is supplied to a first terminal of the switching transistor, and a gate electrode of the driving transistor is connected to a second terminal of the switching transistor, wherein a second terminal of the current controlling transistor is connected to a first terminal of the driving transistor, and a first potential is supplied to a first terminal of the current controlling transistor, wherein a second terminal of the driving transistor is connected to a pixel electrode of the light emitting element, and a second potential which is different from the first potential is supplied to a common electrode of the light emitting element, wherein each of the first line pixel and the second line pixel includes a group of pixels whose gate electrodes of the switching transistors are connected to each other, and wherein all of the gate electrodes of the current controlling transistors of the first line pixel and the second line pixel are directly connected to each other.

12. The display device according to claim 11,
wherein the first shutter and the second shutter comprise at least one liquid crystal element.

13. The display device according to claim 11,
wherein at least one of the switching transistor, the driving transistor, and the current controlling transistor includes an active layer including an oxide semiconductor.

14. The display device according to claim 13,
wherein the oxide semiconductor is an In—Ga—Zn—O-based oxide semiconductor.

15. The display device according to claim 13,
wherein a hydrogen concentration of the active layer is equal to or less than $5 \times 1019/cm3$.

16. The display device according to claim 1,
wherein all of the current controlling transistors of the first line pixel and the second line pixel have a same conductivity type.

17. The display device according to claim 6,
wherein all of the current controlling transistors of the first line pixel and the second line pixel have a same conductivity type.

18. The display device according to claim 11,
wherein all of the current controlling transistors of the first line pixel and the second line pixel have a same conductivity type.

* * * * *

UNITED STATES PATENT AND TRADEMARK OFFICE
CERTIFICATE OF CORRECTION

PATENT NO. : 8,902,209 B2  
APPLICATION NO. : 13/227779  
DATED : December 2, 2014  
INVENTOR(S) : Jun Koyama Page 1 of 1

It is certified that error appears in the above-identified patent and that said Letters Patent is hereby corrected as shown below:

In the Specification:

Column 9, Line 66; Change "foimation" to --formation--.  
Column 23, Line 45; Change "foamed" to --formed--.  
Column 26, Line 55; Change "to the" to --to form the--.

In the Claims:

Column 28, Line 54, Claim 5; Change "5×1019/cm3." to --$5 \times 10^{19}/cm^3$.--.  
Column 29, Line 32, Claim 10; Change "5×1019/cm3." to --$5 \times 10^{19}/cm^3$.--.  
Column 30, Line 32, Claim 15; Change "5×1019/cm3." to --$5 \times 10^{19}/cm^3$.--.

Signed and Sealed this  
Ninth Day of June, 2015

Michelle K. Lee  
*Director of the United States Patent and Trademark Office*